(12) United States Patent
Reineccius

(10) Patent No.: US 11,081,897 B2
(45) Date of Patent: Aug. 3, 2021

(54) HIGH SPEED FEEDBACK ADJUSTMENT OF POWER CHARGE/DISCHARGE FROM AN ENERGY STORAGE SYSTEM

(71) Applicant: STEM, Inc., Millbrae, CA (US)

(72) Inventor: Stacey Reineccius, San Francisco, CA (US)

(73) Assignee: Stem, Inc., Millbrae, CA (US)

( * ) Notice: Subject to any disclaimer, the term of this patent is extended or adjusted under 35 U.S.C. 154(b) by 651 days.

(21) Appl. No.: 13/730,740

(22) Filed: Dec. 28, 2012

(65) Prior Publication Data

US 2013/0207591 A1  Aug. 15, 2013

Related U.S. Application Data

(63) Continuation of application No. 12/825,306, filed on Jun. 28, 2010, now Pat. No. 8,350,521.

(Continued)

(51) Int. Cl.
*H02J 7/00* (2006.01)
*H02J 3/32* (2006.01)
(Continued)

(52) U.S. Cl.
CPC .......... *H02J 7/0042* (2013.01); *H01M 10/44* (2013.01); *H01M 10/46* (2013.01); *H02J 3/32* (2013.01);
(Continued)

(58) Field of Classification Search
CPC . H02J 7/35; H02J 7/355; Y02E 60/12; H01M 10/465
(Continued)

(56) References Cited

U.S. PATENT DOCUMENTS 2,066,603 A * 1/1937 Beetem ...................... H02J 7/32
320/162
3,487,289 A   12/1969 McMurray
(Continued)

FOREIGN PATENT DOCUMENTS

EP    2101403 A2    9/2009
EP    2 204 658 A1  7/2010
(Continued)

OTHER PUBLICATIONS

M.A. Kai, "Lessons Learned from the Texas Synchrophasor Network", IEEE-PES Innovative Smart Grid Technologies Conference, Berlin, Oct. 14-17, 2012.
(Continued)

*Primary Examiner* — Richard Isla
*Assistant Examiner* — Mohammed J Sharief
(74) *Attorney, Agent, or Firm* — Artegis Law Group, LLP

(57) ABSTRACT

The invention provides systems and methods for control of power charge/discharge from energy storage system. The invention also provides for power monitoring and management, including power management for a variable generator. An intelligent charge system may include a premise sensor, a variable generator sensor, one or more energy storage units, and a controller, which may receive information about the power demand, power provided by an electricity provider, and charge/discharge information from an energy storage unit. The information received may all be time synchronized in relation to a time based reference. The controller may provide instructions to an energy storage unit at a rapid rate.

18 Claims, 15 Drawing Sheets

Related U.S. Application Data

(60) Provisional application No. 61/221,508, filed on Jun. 29, 2009, provisional application No. 61/224,466, filed on Jul. 9, 2009, provisional application No. 61/224,838, filed on Jul. 10, 2009.

(51) Int. Cl.
*H01M 10/44* (2006.01)
*H01M 10/46* (2006.01)
*H02J 3/38* (2006.01)

(52) U.S. Cl.
CPC .............. *H02J 3/386* (2013.01); *Y02E 10/76* (2013.01); *Y02E 70/30* (2013.01)

(58) Field of Classification Search
USPC ........................................................ 320/101
See application file for complete search history.

(56) References Cited

U.S. PATENT DOCUMENTS

| | | | |
|---|---|---|---|
| 4,121,147 A | 10/1978 | Becker et al. | |
| 4,287,465 A | 9/1981 | Godard et al. | |
| 4,399,396 A | 8/1983 | Hase | |
| 4,559,590 A | 12/1985 | Davidson | |
| 4,752,697 A | 6/1988 | Lyons et al. | |
| 4,847,745 A | 7/1989 | Shekhawat et al. | |
| 4,996,637 A | 2/1991 | Piechnick | |
| 5,262,931 A | 11/1993 | Vingsbo | |
| 5,274,571 A | 12/1993 | Hesse et al. | |
| 5,369,353 A | 11/1994 | Erdman | |
| 5,510,700 A | 4/1996 | Pomatto | |
| 5,594,318 A | 1/1997 | Nor et al. | |
| 5,595,506 A | 1/1997 | Robinson et al. | |
| 5,620,337 A | 4/1997 | Pruehs | |
| 5,880,536 A * | 3/1999 | Mardirossian | H02J 3/32 307/38 |
| 5,909,367 A | 6/1999 | Change | |
| 5,963,457 A * | 10/1999 | Kanoi | H02J 3/04 700/291 |
| 5,998,968 A * | 12/1999 | Pittman | H02J 7/0093 320/130 |
| 6,005,478 A * | 12/1999 | Boreham | G08B 3/10 307/10.2 |
| 6,015,314 A | 1/2000 | Benfante | |
| 6,018,203 A | 1/2000 | David et al. | |
| 6,059,605 A | 5/2000 | Robinson et al. | |
| 6,160,722 A | 12/2000 | Thommes et al. | |
| 6,172,480 B1 | 1/2001 | Vandelac | |
| 6,200,158 B1 | 3/2001 | Robinson | |
| 6,268,715 B1 | 7/2001 | Oglesbee et al. | |
| 6,301,132 B1 | 10/2001 | Vandelac | |
| 6,310,789 B1 | 10/2001 | Nebrigic et al. | |
| 6,388,421 B2 | 5/2002 | Abe | |
| 6,404,655 B1 | 6/2002 | Welches | |
| 6,420,801 B1 | 7/2002 | Seefeldt | |
| 6,424,119 B1 | 7/2002 | Nelson et al. | |
| 6,429,625 B1 | 8/2002 | LeFevre et al. | |
| 6,476,521 B1 | 11/2002 | Loef et al. | |
| 6,522,031 B2 | 2/2003 | Provanzana et al. | |
| 6,587,362 B1 | 7/2003 | Vithayathil | |
| 6,606,552 B2 | 8/2003 | Haimerl et al. | |
| 6,624,533 B1 * | 9/2003 | Swanson et al. | 307/64 |
| 6,639,383 B2 | 10/2003 | Nelson et al. | |
| 6,750,685 B1 | 6/2004 | Guerrero Mercado | |
| 7,019,666 B2 | 3/2006 | Tootoonian Mashhad et al. | |
| 7,024,321 B1 * | 4/2006 | Deninger | G01R 31/3648 320/113 |
| 7,031,859 B2 | 4/2006 | Piesinger | |
| 7,157,810 B2 | 1/2007 | Kanouda et al. | |
| 7,199,527 B2 | 4/2007 | Holman | |
| 7,248,490 B2 | 7/2007 | Olsen et al. | |
| 7,262,694 B2 | 8/2007 | Olsen et al. | |
| 7,385,373 B2 | 6/2008 | Doruk et al. | |
| 7,456,519 B2 | 11/2008 | Takeda et al. | |
| 7,462,954 B2 * | 12/2008 | Kraus | H02J 9/066 307/64 |
| 7,676,334 B2 | 3/2010 | Matsuura et al. | |
| 7,747,739 B2 | 6/2010 | Bridges et al. | |
| 7,752,145 B2 | 7/2010 | Kelty | |
| 7,804,183 B2 | 9/2010 | Arinaga | |
| 7,933,695 B2 | 4/2011 | Yamaguchi | |
| 8,053,921 B2 | 11/2011 | Ichikawa | |
| 8,125,183 B2 | 2/2012 | Katsunaga | |
| 8,149,114 B2 | 4/2012 | Hanft | |
| 8,183,995 B2 | 5/2012 | Wang et al. | |
| 8,538,616 B2 * | 9/2013 | Yamamoto | B60K 6/445 701/22 |
| 8,643,336 B2 | 2/2014 | Reineccius et al. | |
| 2002/0019758 A1 | 2/2002 | Scarpelli | |
| 2002/0051368 A1 * | 5/2002 | Ulinski | H02M 1/10 363/1 |
| 2002/0171436 A1 | 11/2002 | Russell | |
| 2002/0173902 A1 | 11/2002 | Haimerl et al. | |
| 2002/0190525 A1 | 12/2002 | Worden et al. | |
| 2003/0007369 A1 | 1/2003 | Gilbreth et al. | |
| 2003/0052644 A1 | 3/2003 | Nelson et al. | |
| 2003/0057919 A1 | 3/2003 | Yang | |
| 2003/0076074 A1 * | 4/2003 | Kawai | H02J 7/0069 320/136 |
| 2004/0062059 A1 | 4/2004 | Cheng et al. | |
| 2004/0119441 A1 * | 6/2004 | Koo | B60K 6/46 320/104 |
| 2004/0262996 A1 | 12/2004 | Olsen et al. | |
| 2004/0263116 A1 | 12/2004 | Doruk et al. | |
| 2006/0023478 A1 | 2/2006 | Takeda et al. | |
| 2006/0060162 A1 * | 3/2006 | Fukui | F02D 41/062 123/179.16 |
| 2006/0238932 A1 | 10/2006 | Westbrock, Jr., et al. | |
| 2007/0005195 A1 | 1/2007 | Pasquale et al. | |
| 2007/0035135 A1 * | 2/2007 | Yoshida | F03D 7/0284 290/44 |
| 2007/0038396 A1 | 2/2007 | Zima et al. | |
| 2007/0117436 A1 | 5/2007 | Davis | |
| 2007/0145952 A1 | 6/2007 | Arcena | |
| 2007/0200433 A1 | 8/2007 | Kelty | |
| 2008/0012667 A1 | 1/2008 | Colsch et al. | |
| 2008/0143292 A1 * | 6/2008 | Ward | 320/101 |
| 2008/0183408 A1 | 7/2008 | Matsuura et al. | |
| 2008/0272934 A1 | 11/2008 | Wang et al. | |
| 2008/0279321 A1 | 11/2008 | Bickel et al. | |
| 2009/0088991 A1 | 4/2009 | Brzezowski et al. | |
| 2009/0102424 A1 | 4/2009 | Tien et al. | |
| 2009/0146423 A1 | 6/2009 | Arinaga | |
| 2009/0160259 A1 | 6/2009 | Naiknaware et al. | |
| 2009/0288896 A1 | 11/2009 | Ichikawa | |
| 2010/0034003 A1 | 2/2010 | Rozman et al. | |
| 2010/0082464 A1 | 4/2010 | Keefe | |
| 2010/0114387 A1 | 5/2010 | Chassin | |
| 2010/0207448 A1 * | 8/2010 | Cooper | H02J 3/14 307/20 |
| 2010/0259210 A1 * | 10/2010 | Sasaki | F03D 9/11 320/101 |
| 2010/0284206 A1 * | 11/2010 | Tai | G06F 1/263 363/126 |
| 2010/0285339 A1 * | 11/2010 | Chaturvedi | H01M 10/441 429/61 |
| 2010/0305770 A1 * | 12/2010 | Bhowmik | B60L 58/18 700/295 |
| 2011/0199042 A1 * | 8/2011 | Abe | H01M 10/443 320/101 |
| 2011/0221195 A1 | 9/2011 | Raju | |
| 2011/0257825 A1 * | 10/2011 | Yamamoto | B60K 6/445 701/22 |
| 2012/0069619 A1 | 3/2012 | Badger et al. | |
| 2012/0319748 A1 | 12/2012 | Luo | |
| 2013/0030588 A1 | 1/2013 | Smith et al. | |

FOREIGN PATENT DOCUMENTS

| | | |
|---|---|---|
| EP | 2 475 059 A1 | 7/2012 |
| JP | 2002-305842 A | 10/2002 |

(56) References Cited

FOREIGN PATENT DOCUMENTS

| | | | |
|---|---|---|---|
| JP | 2006-141093 A | 6/2006 | |
| JP | 2006-338889 A | 12/2006 | |
| JP | 2008-141918 A | 6/2008 | |
| JP | 2008-178215 A | 7/2008 | |
| TW | 200849770 A | 12/2008 | |
| WO | WO 2008073472 A2 * | 6/2008 | ................ B60L 3/12 |

OTHER PUBLICATIONS

Chenier, Glen. Reversal of Fortune. Electronic, Design, Strategy, News. 2009. p. 62.

Cha et al. "A New Soft Switching Direct Converter for Residential Fuel Cell Power System", IAS 2004. 2:1172-1177.

Choe et al. "A Parallel Operation Algorithm with Power-Sharing Technique for FC Generation Systems". 2009.725-731.

Non-Final Office Action for U.S. Appl. No. 14/171,402 dated Aug. 29, 2014, 45 pages.

Extended European Search Report for application No. 10800278.3 dated Jul. 16, 2014, 8 pages.

* cited by examiner

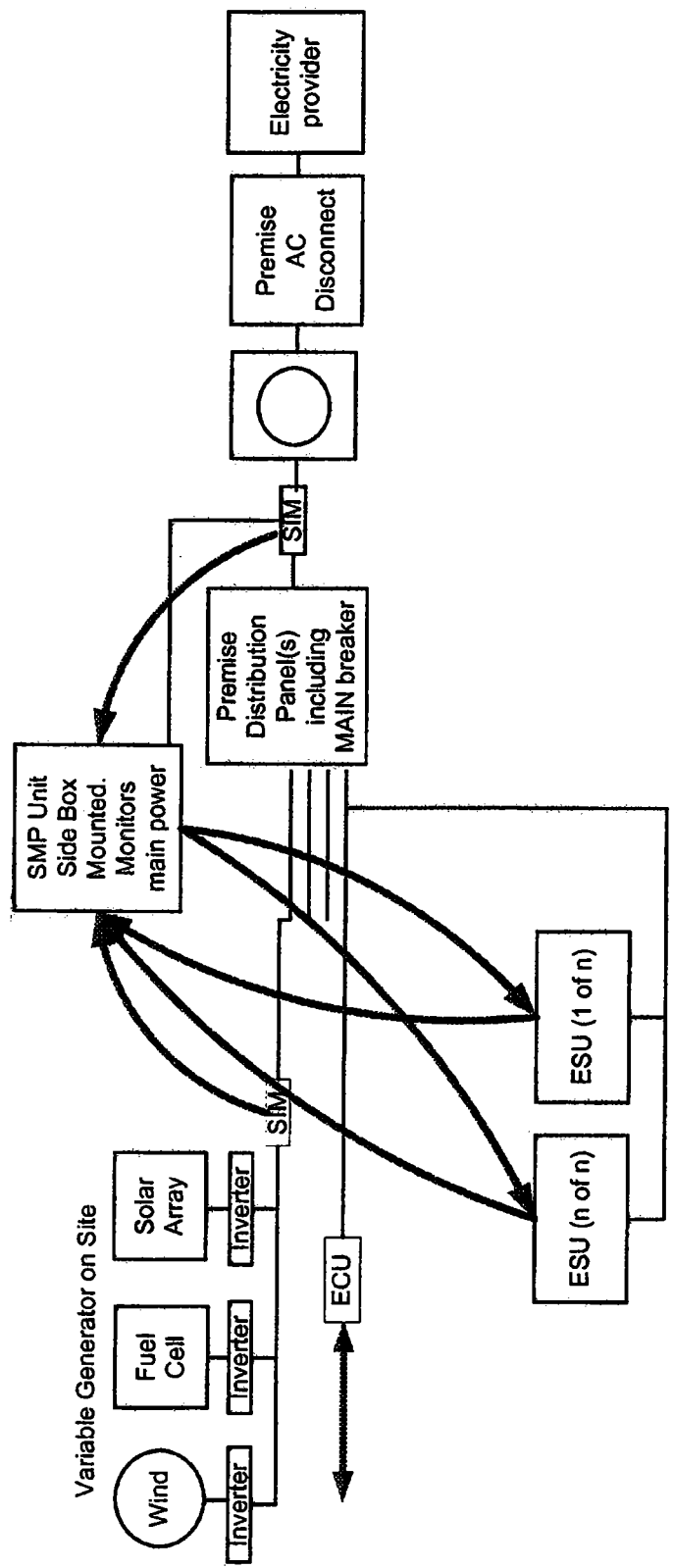

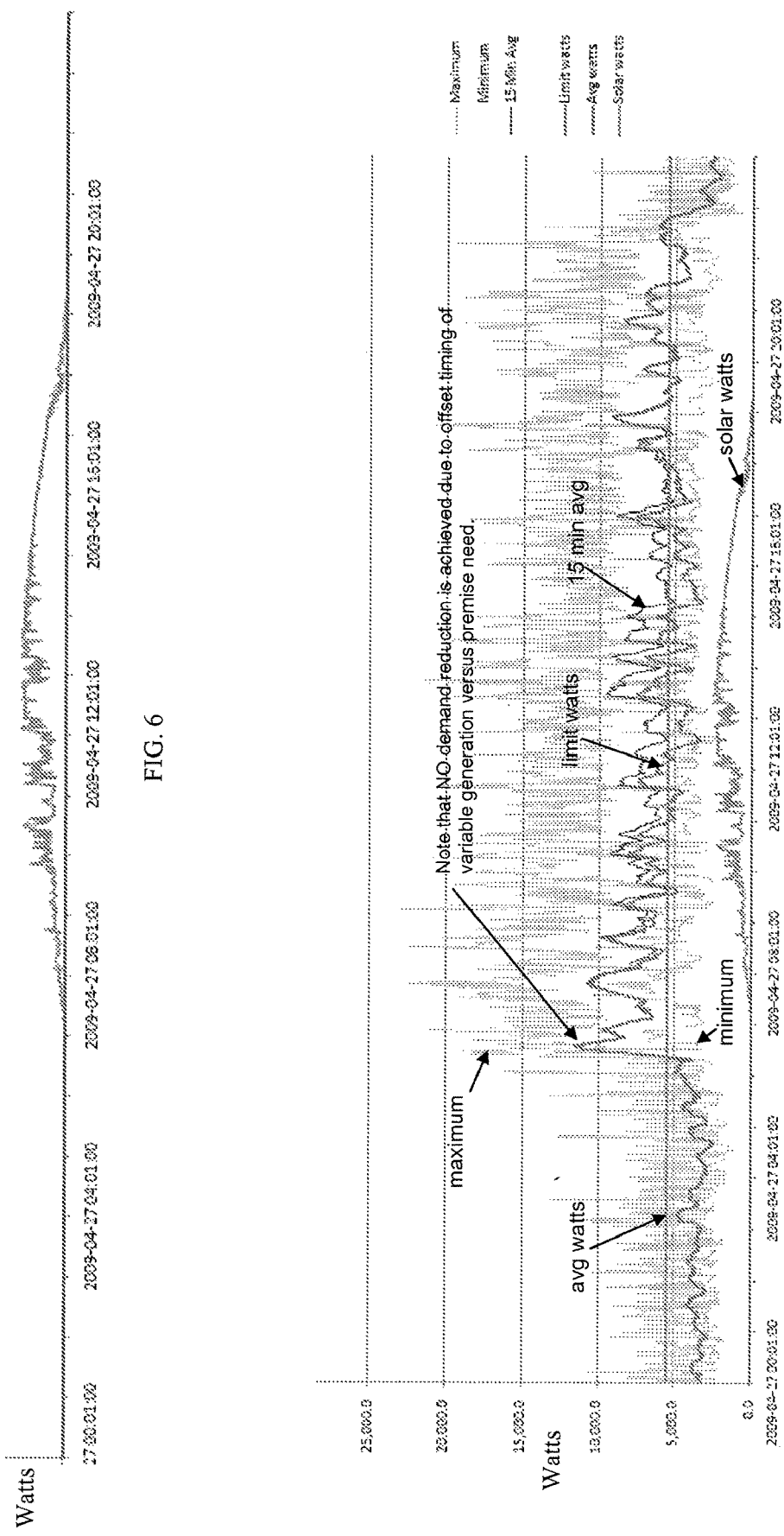

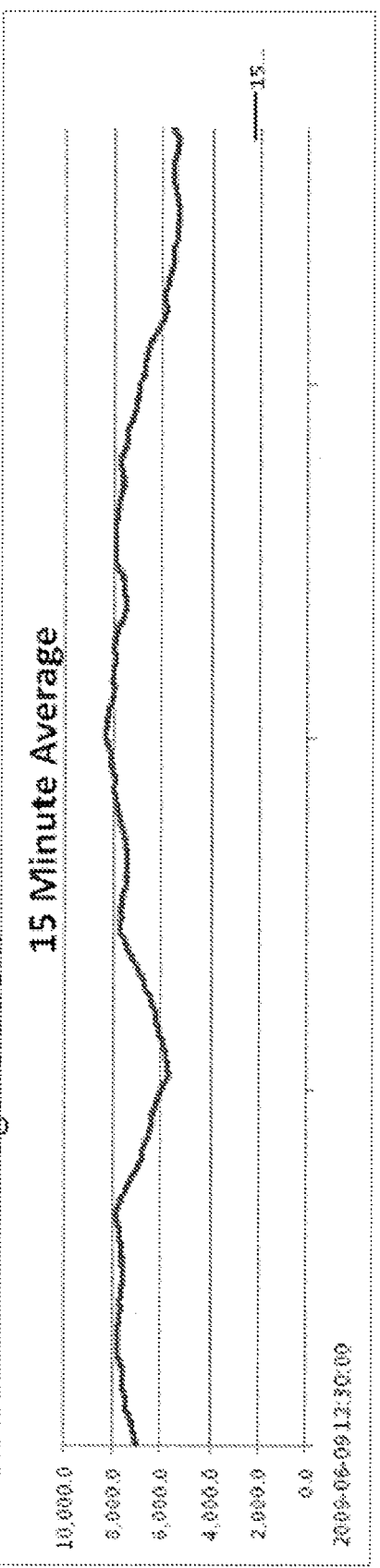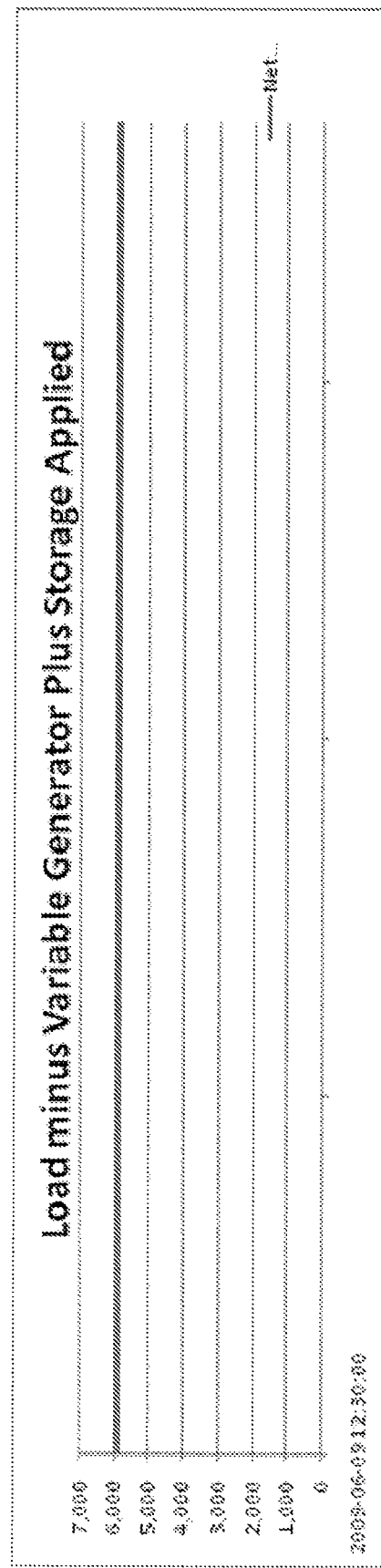
FIG. 13

HIGH SPEED FEEDBACK ADJUSTMENT OF POWER CHARGE/DISCHARGE FROM AN ENERGY STORAGE SYSTEM

CROSS-REFERENCE

This application is a continuation of co-pending U.S. patent application Ser. No. 12/825,306, filed Jun. 28, 2010, which also claims the benefit of U.S. Provisional Application No. 61/221,508 filed Jun. 29, 2009, U.S. Provisional Application No. 61/224,466 filed Jul. 9, 2009, and U.S. Provisional Application No. 61/224,838 filed Jul. 10, 2009, which applications are incorporated herein by reference in their entirety.

BACKGROUND OF THE INVENTION

Variable generation sources such as wind, solar photovoltaic, hydro or other variable sources, while capable of generating sometimes significant energy, do not generate reliable enough output to be able to be counted upon for critical or even typical loads. One example of a critical load may be that refrigeration within a pharmacy or doctor's office needs constant power to assure proper operation. The intermittent nature and variability of these types of generation is only randomly in synch with the load on site, as the generation is generally not controllable.

In typical commercial and many smaller configurations, electric utilities charge different rates for energy and power, and the rates are often differently based on time of day and day of week. The previously described variable characteristics in a traditional variable generator system result in variable generation affecting the energy portion of the utility bill but NOT affecting the power (aka demand) portion of the bill. As the demand portion can be as much as 40% of a typical commercial bill, an improvement over traditional system could make a significant impact on the financial return (savings or impact on demand portion of bill) when utilized together with the variable generator.

Thus, a need exists for more intelligent power charge and discharge systems and methods, which effectively utilizes an energy storage system in conjunction with a variable generator.

SUMMARY OF THE INVENTION

An aspect of the invention is directed to an intelligent charge system comprising a premise sensor for measuring premise power information, wherein the premise power information provided by the premise sensor is time synchronized with a time reference; a variable generator sensor for measuring variable generator power information, wherein the variable generator power information is time synchronized with the time reference; at least one energy storage unit, wherein the energy storage unit can send information that is synchronized with the time reference; and a control computer which receives time synchronized information from the premise sensor, the variable generator sensor, and the energy storage unit, and provides a charge/discharge instruction to the energy storage unit based on the received time synchronized information.

Another aspect of the invention is directed to a method of power monitoring and management comprising providing, at a controller, a desired limit load; receiving, at the controller, power demand load information; receiving, at the controller, variable generator power information; and transmitting, from the controller to an energy storage unit, a charge/discharge instruction based on the desired limit load, the power demand load information, and the variable generator power information, wherein the charge/discharge information is delivered at a fast sample rate. In some embodiments, the fast sample rate may be every 15 minutes or less.

A method of power monitoring and management may be provided in accordance with another aspect of the invention. The method may include receiving premise power information from a premise sensor, wherein the premise power information is time synchronized with a time synchronization reference; receiving variable generator power information from a variable generator sensor, wherein the variable generator power information is time synchronized with the time reference; receiving state of charge information from at least one energy storage unit, wherein the state of charge information is synchronized with the time synchronization reference; and providing a charge/discharge instruction to the energy storage unit based on the received premise power information, the received variable generator power information, and the received state of charge information.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 shows a diagram of a smart charge system using a variable generator in accordance with an embodiment of the invention.

FIG. 6 shows an example of a variable generation curve of a typical variable generator installation.

FIG. 7A shows an example of power adjustment achieved without storage synchronization.

FIG. 13 shows a comparison of 15 minutes average for a grid view without storage but with variable generation, and 15 minutes average for a grid view with storage and with variable generation.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for control of power charge/discharge from energy storage system. The invention further provides for systems and methods for power load reduction by using a variable generator in conjunction with an energy storage system. Such configurations may include high speed feedback power adjustment. Various aspects of the invention described herein may be applied to any of the particular applications set forth below or for any other types of power generation, control and distribution. The invention may be applied as a standalone system or method, or as part of an integrated power delivery or control system. It shall be understood that different aspects of the invention can be appreciated individually, collectively, or in combination with each other.

High Speed Feedback

Figure 1:
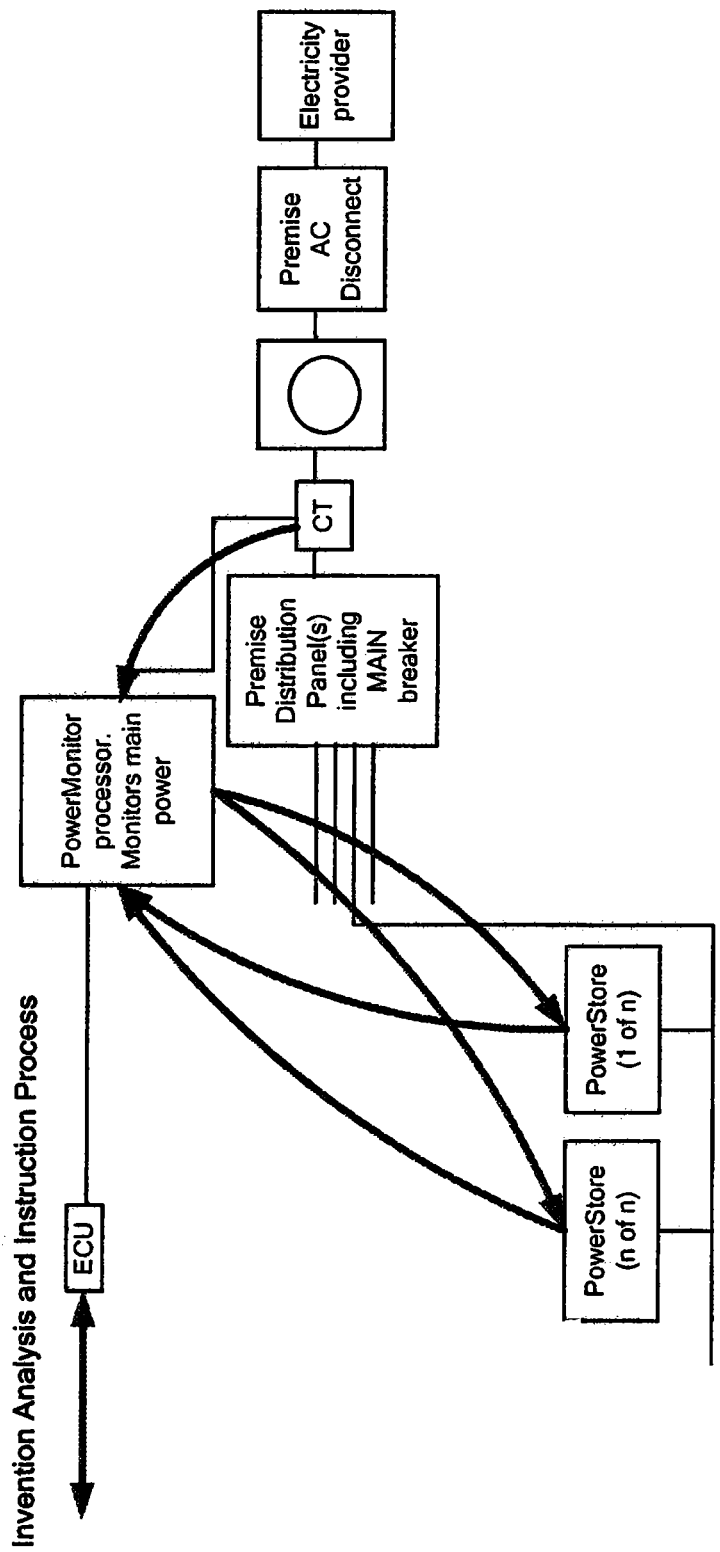
FIG. 1 shows a diagram of an embodiment of a smart charge system showing action flows.

FIG. 1 shows a diagram of an embodiment of a smart charge system showing action flows. A smart charge system may include an electricity provider, a premises distribution panel, a sensor interface module (SIM) measurement device, an energy storage unit (ESU), a site monitoring processor (SMP) computer, and an external communications unit (ECU).

In some embodiments, the electricity provider may be a utility or grid. In some embodiments, the electricity provider may be any third party energy provider. The electricity provider may utilize a generator source to provide electricity. The electricity provider may utilize any other known system in the art to provide electricity.

A smart charge system may also include a premise distribution panel. The premises distribution panel may deliver power to premises which may have a load. In some embodiments, the premises may include a residence, a small-scale commercial structure, a large-scale commercial structure, or any other establishment that may have a load. In some embodiments, the premises need not be a building or structure, but may include any device or apparatus that has a load, and thus requires power.

The premises distribution panel may include a main breaker. A premises distribution panel may be a component of an electricity supply system which may divide an electrical power feed into subsidiary circuits, while providing a protective fuse or circuit breaker for each circuit, in a common enclosure. In some implementations, a main switch, and optionally, one or more Residual-current devices (RCD) or Residual Current Breakers with Overcurrent protection (RCBO), may also be incorporated.

The electricity provider may be in communication with the premises distribution panel via a premise AC disconnect, one or more meter sockets with meters, and a SIM measurement device. Any meter socket and meter known in the art may be utilized to connect a distribution panel with an electricity provider, such as a local generator grid. In a preferable embodiment, a meter socket with meter may also include a meter socket insert, such as that described in U.S. patent application Ser. No. 12/716,258 filed on Mar. 2, 2010, which is hereby incorporated by reference in its entirety. A meter socket insert may allow for a quick interconnection between a premises distribution panel on a consumer side and a utility grid on a provider side, rather than requiring an upgraded breaker in the premises management panel, which may require extensive and time consuming work.

The SIM measurement device, which may also be referred to as a power measurement probe, may be a high speed-high accuracy sensor at a main entry to the premises. In preferable embodiments, the SIM measurement device may be on the consumer side of a meter in a typical installation. However, in alternate embodiments, the SIM measurement device may also be on the grid (supply) side. The SIM device may measure total power being supplied by a generator source to a given load. The SIM device may measure total power by measuring current and voltage at specific times on each phase of the service power for the premises.

The SIM device may be configured to provide such measurements at a high sample rate. In some instances, the SIM device may include an internal clock, or may be in communication with an external clock, in order to provide time references. The SIM device may utilize any time synchronization reference.

The smart charge system may also include one or more ESU, which may also be referred to as a PowerStore. An ESU may have controllable fast charge/discharge capability. In some embodiments, an ESU may have such fast charge/discharge capability due to the use of a bidirectional inverter-charger. The bidirectional inverter-charger may also be used for bidirectional energy conversion so that it may function as a DC to AC energy converter and/or an AC to DC energy converter within the same device or component. For example, a circuit may be provided that may function for bidirectional energy conversion. Within the circuit, current may flow in opposite directions, depending on the mode of operation. Thus a bidirectional energy converter may be able to function as an inverter and as a rectifier. In a preferable embodiment of the invention, an ESU may utilize a bidirectional energy converter, such as the converter described in U.S. patent application Ser. No. 12/731,070 filed on Mar. 24, 2010, which is hereby incorporated by reference in its entirety. In some instances, a dual processor may be provided for a bidirectional energy converter.

The ESU may include any system capable of storing energy, such as a battery, fuel cell, capacitor, supercapacitor, hypercapacitor, superconducting magnetic energy storage, any other electrochemical, electrical, or mechanical energy storage system, or any combination thereof. The ESU may be any energy storage system capable of being charged and discharged repeatedly. Any discussion herein of any particular type of ESU may also be applicable to any other type of ESU.

In some embodiments, the ESU may include a controller that may be able to gather information about the ESU and receive instructions relating to the ESU. For example, the controller may be able to monitor a state of charge for the ESU, charge and discharge capabilities for the ESU, and the current rate of charge/discharge. In some embodiments, the controller may report the gathered information. The controller may also receive instructions whether to charge or discharge, the power level to charge or discharge, the maximum duration of the charge or discharge in the case of loss of communication, the phase of power against which this is to apply for each phase, and/or other instructions. In some embodiments, the controller may be a computer or may include a processor.

Any number of ESUs may be provided within a smart charge system. For example, one, two, three, four, five, six, eight, ten, fifteen, twenty, or more ESUs may be provided in the system. For example, n ESUs may be provided, where n is any integer with a value of one or greater. In some embodiments, the ESUs may all be of the same type (e.g., the same type of battery), while in other embodiments different types of ESUs may be used in combination (e.g., any of the ESUs mentioned herein may be used in conjunction with any other of the ESUs mentioned). The ESUs may be connected in series, in parallel, or in any combination thereof. In some embodiments, a controller may be provided for each ESU, while in other embodiments, the controller may be provided for the entire group of ESUs, or for subgroups of ESUs.

The smart charge system may utilize a Site Monitoring Processor (SMP) computer, which may coordinate actions. The SMP computer may also be referred to as a Power-Monitor computer. There may be communications between the various units described in the smart charge system, and the SMP computer may coordinate the actions taken by the various units and monitor main power. The SMP computer may run appropriate software, which may be embedded as its own unit, or may be part of a storage cabinet. The SMP computer may be unit side and box mounted. The SMP computer may run software or applications according to a set of instructions, code, logic, or computer readable media. Any algorithm, calculation, or other steps may be implemented using tangible computer readable media, which may include code, logic, instructions for performing such steps. Such computer readable media may be stored in memory. One or more processor may access such memory and implement the steps therein. This may include the memory and/or processor of the SMP computer. The SMP computer may be specially programmed to perform the steps or calculations described herein.

An SMP computer may be any device capable of manipulating data according to a set of instructions. For example, an SMP computer may be a personal computer, a laptop, a personal digital assistant (PDA), mobile phone, or any other type of computing device. The SMP computer may include a microprocessor, memory, and/or a user interface device, such as a display. The SMP may be in communication with the premises distribution panel, the SIM device, and one or more ESUs. The SMP may receive information from the premises distribution panel, the SIM device, and the ESUs, and may accordingly provide instructions to the ESUs.

The smart charge system may also utilize an ECU in accordance with an embodiment of the invention. The ECU may securely transmit data, including data on time synchronization, performance, confirmations of downloaded instructions, updates, and so forth, to the central operations system. The smart charge system may include a time base reference, which may be used to synchronize all of the components of the system, which may be obtained via the ECU, or alternatively which may internal to the system. For example, the time based reference may be used to synchronize a SIM device, ESUs, and an SMP computer. The time based reference may be internal or obtained from an external reference source such as GPS or networked based NTP.

Any components of the smart charge system may communicate with one another through a wired or wireless connection. For example, they may be connected to one another over a network, such as a local area network (LAN), or wide area network, such as the Internet.

FIG. 1 shows an embodiment of the power monitoring system and how it may operate according to some exemplary methods. The power monitoring system may operate by monitoring the flow of current and measuring the voltage on each phase of power, time stamping this information according to a time synchronized reference, sending the information via communications to a control computer, which may monitor state of activity, charge of ESU, and other information, and send instructions for rapid charge and/or discharge of an ESU. The power monitoring system may include (1) SIM measurement, which may send high sample rate data, time stamped against a synchronized time reference, to an SMP computer, giving data on source ID of measurements; (2) ESU, which may report current state of charge and charge/discharge capabilities, and current rate of charge/discharge to SMP computer, against the synchronized time reference; (3) SMP computer, which may compare current load as seen by SIM (measurement units) against desired level of electricity provider viewed load (as derived locally or instructed from remote via ECU) and may then issue commands to the ESU(s) instructing each unit with (i) charge or discharge, (ii) power level to charge or discharge, (iii) maximum duration of charge or discharge in case of loss of communication, and (iv) phase of power against which this may apply for each phase; and (4) ECU, which may securely transmit data on time synchronization, performance, confirmations of downloaded instructions, updates, etc. to a central operations system. As illustrated in FIG. 1: (1) Current Measurement Probes sends high sample rate data, time stamped against synchronized times reference, to PowerMonitor computer, giving data on source ID of measurements; (2) PowerStore reports current state of change and charge/discharge capabilities and current rate of charge/discharge to PowerMonitor computer, against synchronized time reference; (3) PowerMonitor computer compared current load as seen by Current and Voltage measurement units against desired level of electricity provider viewed load and then issues commands to PowerStore Unit(s) instructing each unit with (i) charge or discharge, (ii) power level to charge/discharge, (iii) max duration of charge/discharge in case of loss of communication, and (iv) phase of power against which this is to apply to each phase; and (4) External Communications Unit securely transmits data on time synchronization, performance, conformations of downloaded instructions, updates, etc. to central operations system.

A system sensor (SIM) may constantly monitor the flow of current and measure voltage on each phase of power. Thus, the system sensor may be able to monitor the power flow provided by an electricity provider to the premises. Preferably, this data may be time stamped according to a time synchronized reference. In some embodiments, the time synchronized reference may be provided by a clock. The clock may be a system sensor clock or a controller clock, any other clock within the power monitoring system, or any other clock external to the power monitoring system. The time synchronized reference may be internal to the system sensor, it may be internal to the power monitoring system, or it may be external to the power monitoring system.

Preferably, the system sensor may be able to monitor the power flow at a high sample rate. For example, the system sensor may be able to monitor current and voltage every 15 minutes or less, every five minutes or less, every three minutes or less, every two minutes or less, every one minute or less, every 45 seconds or less, every 30 seconds or less, every 15 seconds or less, every ten seconds or less, every five seconds or less, every four seconds or less, every three seconds or less, every two seconds or less, every second or less, every 500 ms or less, every 200 ms or less, every 100 ms or less, every 50 ms or less, or every 10 ms or less. In some examples, the high sample rate may be sampling at about 4 times/hr, 6 times/hr, 12 times/hr, 20 times/hr, 1 time/min, 2 times/min, 4 times/min, 6 times/min, 12 times/min, 20 times/min, 1 time/sec, 4 times/sec, 10 times/sec, 50 times/sec, 100 times/sec, 500 times/sec, or 1000 times/sec or more. Thus, the system sensor may be able to more or less continuously monitor the power flow from the electricity provider in fine detail.

The system sensor may be provided as a consumer or customer side sensor. This may be advantageous over systems where such sensors are provided on the utility or supply side. Having the system sensor on the customer side may enable the system sensor to be applied locally to a pre-existing system, without requiring any action by the electricity provider. The system sensor may be installed on pre-existing equipment. Also, in some embodiments, the system sensor and/or a meter may be provided on the customer side in smaller scales, such as residences, homes, or small commercial establishments.

The system sensor may send information, such as power information, which may include voltage and current information, via communications to a control computer. The control computer (SMP) may maintain the current state of activity and charge of a battery (or any other ESU) as well as charge limits and other parameters for algorithms programmed into the control computer. The control computer may receive power information from the system sensor, as well as load information from a premise distribution panel, and information from one or more batteries. The control computer may also receive time synchronization information from an ECU or any other time synchronization reference. Any information that the control computer may receive may be time stamped. Alternatively, the control computer may have an internal time synchronization reference. The control computer may have a control computer clock. The control computer clock may or may not be time synchronized to another clock within the system or external to the system.

The control computer may instruct one or more batteries (or any other ESU) in rapid fashion. Such instructions may include time synchronization information, as well as instructions whether to charge or discharge, the power level to charge or discharge, the maximum duration of charge or discharge in case of loss of communication, or the phase of power against which this is to apply for each phase. Advantageously, the instructions provided by the control computer may depend on feedback provided by the battery and other units within the power monitoring system. For example, charge/discharge instructions provided by the control computer may depend on information provided by the battery, the system sensor, and/or the ECU. Any such information may be time stamped in accordance with a time synchronization reference. Also, the instructions may include default instructions in case communication is lost, and feedback is no longer provided. Such default instructions may take the latest feedback into account, which may allow for updated, improved performance, even when connections are lost.

Preferably, the control computer may instruct and/or monitor the battery in rapid fashion. For example, the control computer may instruct the battery in time increments that may be 30 seconds or less, 15 seconds or less, ten seconds or less, five seconds or less, three seconds or less, two seconds or less, one second or less, 500 ms or less, 100 ms or less, 50 ms or less, 10 ms or less, or 1 ms or less. The control computer may instruct the battery at a high sample rate. Any sample rate, including those discussed elsewhere herein, may be used. In some instances, the control computer may also receive information from the battery at similar time increments. The control computer may send instructions to the battery in rapid fashion, and the battery may be able to respond in similarly rapid fashion. The battery may have a speedy response via bidirectional energy converters, including those described previously.

The batteries may be instructed so that the inverters are to discharge, or if below a limit, the batteries may be set to charge. For example, if the battery state of charge falls below a minimal threshold, the battery may be set to charge, or at least not discharge, even during peak time. In some instances, the batteries may be instructed to charge if the battery is not fully charged and an algorithm of the control computer does not otherwise indicate to not charge. In some embodiments, the battery may be charged even during peak time.

In some embodiments, a plurality of batteries may be provided. Each battery may have the same state of charge or a different state of charge. A control computer may receive information about the state of charge of each battery. The control computer may receive information about the average state of charge of the various batteries or may receive information about each state of charge for each battery or groups of batteries. Each battery may receive charge/discharge instructions. In some embodiments, the charge/discharge instructions to each battery may be the same. Alternatively, charge/discharge instructions may vary from battery to battery or from groups of batteries to groups of batteries. In some embodiments, the charge/discharge instructions to each battery may depend on the state of charge of that battery. In some embodiments, the charge/discharge instructions may depend on the state of charges of the other batteries. In some embodiments, the charge/discharge instructions to a battery may depend on the state of charge of each battery in the system or within the group.

By discharging an energy storage unit when the premise demand is above the desired limit, the apparent demand (power demand as seen by the utility meter) may be reduced to the desired limit. The power provided by the energy storage unit may make up the difference between the actual premise demand and the desired limit. Thus, the apparent demand on the electricity provider may be at the desired limit. In some embodiments, the desired limit may be a constant value, or in other embodiments the desired limit may vary. The desired limit may be determined by a control computer or the power monitoring system, or an external device. The desired limit may be determined by a user input, such as a customer input.

By discharging an energy storage unit rapidly (e.g., at <1 second intervals, or any other time intervals mentioned) the apparent demand/power level may be kept smooth and may avoid harmonics being generated in the electric system. The rapid discharge of the energy storage system may enable the system to react more quickly to rapid fluctuations of the actual load.

Similarly, by charging the energy storage in short intervals when the premise demand (plus charge desired by the control computer) is known to be below the desired limit (net of current discharge by the energy storage), the system may recharge the energy storage. This may occur at off-peak and/or peak times. The net state of charge of the energy storage may be measured and reported through the communications means to the control computer at the end of each interval of charge/discharge. Any of these actions may take place at a rapid rate (e.g., at <1 second intervals, or any other time intervals mentioned). The rapid charge of the energy storage system may advantageously allow for the state of charge of the energy storage system to not decrease as much as traditional systems that do not allow for charging during peak hours. For example, the rapid charge may allow the energy storage system state of charge to decrease by about 80% or more, 60% or more, 50% or more, 40% or more, 30% or more, 20% or more 15% or more, 10% or more, or 5% or more than in traditional systems.

This opportunistic short duration charge may allow for a greater amount of energy capacity to be present for the next charge/discharge decision by the algorithm running in the control computer.

Taken together, this short interval charge and discharge procedure may serve to reduce the size of the necessary energy storage needed to achieve a specific level of power demand reduction. This reduction may make the cost effectiveness much greater and physical issues of installation easier by reducing the physical weight and volume of energy storage required to meet the target power level. The exact level of reduction depends on the specific load characteristics of an installation site but can be expressed, generally by the following formulas:

Traditional Technologies:

$$EnergyStorageCapacity(x) = $$
$$(MinimumChargeLevel\% * MaxloadinKWH) + $$
$$\frac{\sum_{n=1}^{Intervals\ in\ duration} [[(Power_{over})]IntervalLength]}{(DischargeEfficiency)}$$

For a smart charge system:

$$EnergyStorageCapacityNEW(x) = $$

-continued $$(MinimumChargeLevel\% * MaxloadinKWH) + $$
$$\sum_{n=1}^{Intervals\ in\ duration} \left[ \left( \frac{\frac{Power_{over}}{(DischargeEfficiency)} - }{(Power_{under} * ChargeEfficiency) - (Power_{generator})} \right) \right]$$
$$IntervalLength$$

where 'n' is the number of intervals in the total period being stored for.

The formula shows that the energy storage size required using a smart charge technique may be smaller than the size required under current commonly used techniques. Further, data shows that the higher the rate of measurement (i.e. the shorter the time frame) that the more power under the limit targeted there will be, thus further reducing the energy storage capacity needed.

Figure 2:
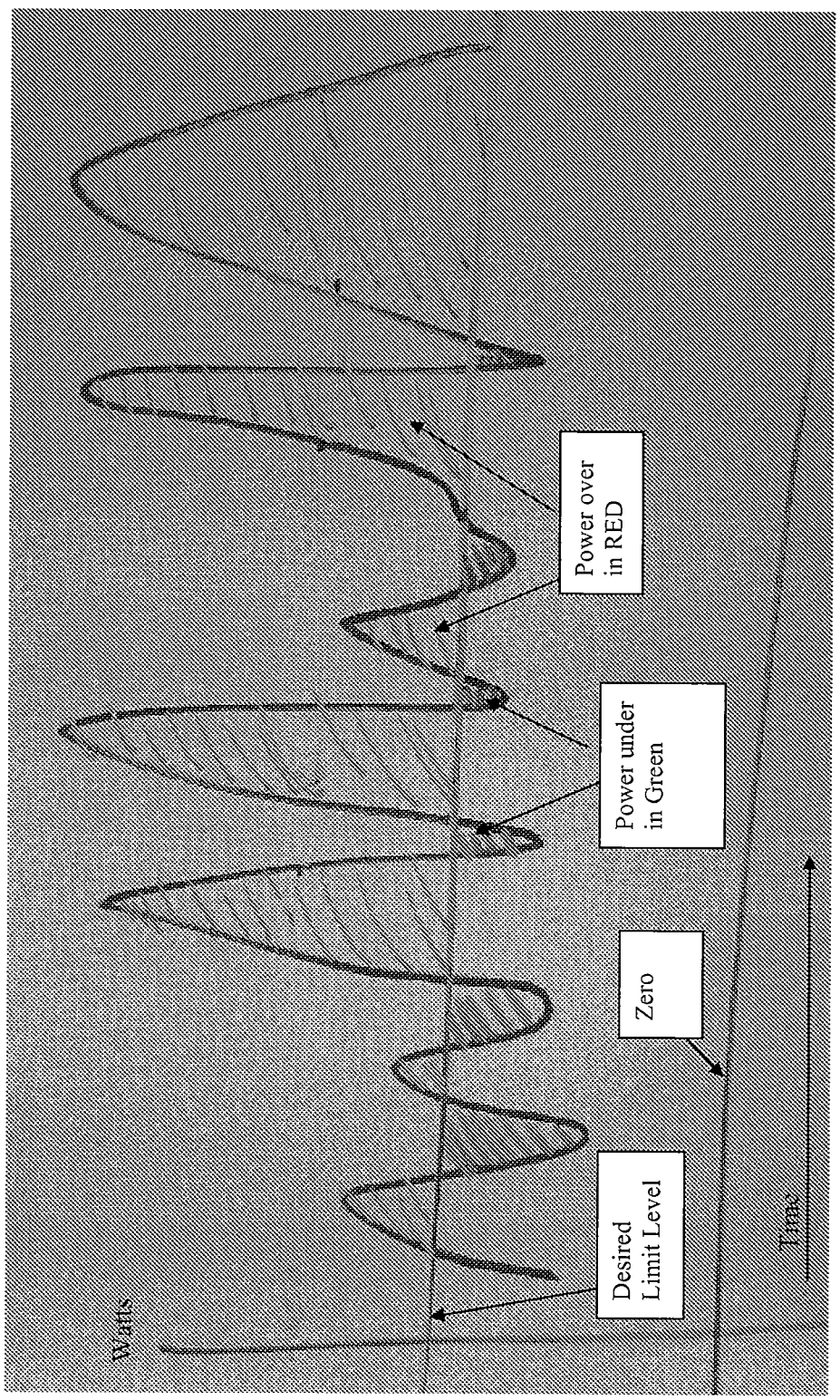
FIG. 2 shows an example of a power load and a desired limit level.

FIG. 2 shows an example of a premise power load and a desired limit level. FIG. 2 shows how a power load may fluctuate over time. A desired limit level may be determined by the smart charge system. In some embodiments, the desired limit level may be constant over time, while in other embodiments the desired limit load may vary. A desired limit load may be automatically selected by a program or algorithm, or may be manually selected by a user. The power over the desired limit level may be displayed, as well as the power under the desired limit load. A zero level may also be displayed as a point of reference.

In some embodiments, an energy storage unit may be utilized such that the apparent demand to an electricity provider is the desired limit load. When the premise power load exceeds the desired limit load, the energy storage unit may be discharged to make up the difference. In some embodiments, when the state of charge of the energy storage unit falls beneath a certain threshold, the energy storage need not be discharged even if the apparent demand is above the desired limit load. Similarly, when the premise power load is below the desired limit load, the energy storage unit may be charged so that the apparent demand is at the desired limit load. If the energy storage unit is already fully charged, the energy storage unit need not be charged even if the apparent demand is below the desired limit load. In another embodiment, the energy storage may be utilized to determine that the apparent demand does not exceed the desired limit load. In some instances, the apparent demand may fall beneath the desired limit load. Other algorithms may be provided that may govern the charging and/or discharging of the energy storage unit.

In some embodiments, the discharge of the energy storage unit (ESU) may be controlled so that the desired limit load is met or not exceeded. In preferable embodiments, this may be achieved by staying at the current level. The voltage level may be varied accordingly. In other embodiments, a desired limit load may be achieved by staying at the voltage level, while allowing the current load to vary accordingly.

As discussed previously, when a higher rate of measurement and response is provided, more power may result in falling below the limit load line. Advantageously, the needed energy storage capacity for a given level of power demand level reduction may be significantly reduced. Another advantage of utilizing the smart charge system may be that the energy storage depth of discharge is reduced resulting a longer working life of the energy storage component. For example, the energy storage component with a high rate of measurement may have about a 60% or more, 50% or more, 40% or more, 30% or more, 20% or more 15% or more, 10% or more, or 5% or more longer life than an energy storage component in a traditional system. With a longer life and reduced size, the effective cost of energy storage for a given level of return from demand charge reduction may be reduced, thereby making the solution more cost effective.

Another benefit of the smart charge system is that it may be easily integrated into a pre-existing power system. By having components that are provided on the customer side, instead of the utility side, individual entities may easily integrate the smart charge system into a pre-existing power system. For example, a system sensor may be on the customer side. Similarly, a control computer and/or energy storage unit may be on the customer side. Furthermore, after easy installation on the customer side, a customer need not change the customer's behavior; the system may operate automatically. The customer may interact with an electricity provider in the same manner as prior to installation of the system, but the system may act on the customer's side to allow the customer to save on the peak demand charge portion of the customer's electricity bill.

With a more cost effective energy storage capacity to effect ratio, new applications may be opened including:
- By reducing the customer's apparent peak demand the customer may save on the peak demand charge portion of their electricity bill.
- By keeping the power demand lower through the additional local supply from the energy storage, the power factor of the local premise may be improved.
- By lowering the average apparent demand to the utility the efficiency losses in the transmission may be reduced, and distribution grid as well as the transmission lines may be less loaded and so have lower loss in aggregate leading to lower fuel consumption for a given level of energy delivery.
- By extending the effective life of motor driven equipment, especially multiphase motors, by balancing the power quality on the phases preventing equipment from overheating due to bad power.
- The customer using the invention does not have to change out, or modify current equipment or procedures to realize value from demand savings.
- By leveling the power demand, the generator at the main grid electricity provider delivering power may run more efficiently, reducing its fossil fuel consumption and lowering generation losses presently seen as heat which then require cooling resources. Overall reductions in green house gas (GHG) production may be seen as a result of this impact from the Invention.

Variable Generation

In accordance with one aspect of the invention, an intelligent charge system may incorporate variable generation. Such variable generation may be provided in addition to electricity provided by an electricity provider. One or more variable generators may be provided, where a variable generator may provide power intermittently, or at varying levels over time. In some embodiments, the level provided by a variable generator may fluctuate over time. Examples of variable generators may include wind generators, a solar electric generator system (PV, solar thermal, other), water-powered generator, geothermal generator, or other variable generator. In some embodiments, one or more variable generator may be provided on-site for an intelligent charge system. Alternatively, the variable generator may be remote to the load, but the power generated by the variable generator may be provided to the intelligent charge system. In some instances, all of the variable generators within the system may be of the same type of generator (e.g., all PV, or all wind), while in other instances, the variable generators may be if different types.

An intelligent charge system may be able to take advantage of such variable generators. This may be achieved by high speed voltage and current measurements, fed back to a controlling computer which may then control the adjustment of power charge/discharge of a local storage unit in order to level power demand load by synchronizing the charge/discharge of the locally attached storage with the power output of the variable generator. The adjustment of power charge/discharge may also occur at a rapid rate.

FIG. 3 shows a diagram of an intelligent charge system using a variable generator in accordance with an embodiment of the invention. The intelligent charge system may utilize any of the components, features, or steps taken with regard to any other embodiments described herein. For example, such components, features, or steps may include features relating to time synchronization and high speed feedback, customer side implementations, or how various units may function and interact with one another. Additionally, the intelligent charge system may have any of the advantages provided by other embodiments discussed herein. For example, the intelligent charge system may provide a customer side solution that need not affect the electricity provider, may allow easy integration into a pre-existing system, may lower an electricity bill by lowering peak demand power, and may require a smaller energy storage system than traditional systems. As illustrated in FIG. 3: (1) Measurement sends high sample rate data, time stamped against synchronized time reference, to SMP computer, giving voltage and current measurements and source ID of measurements; (2) Measurement attached to output of Variable generator (DC or AC) send high sample rate data, time stamped against synchronized time reference, to SMP computer, giving voltage and current measurements and source ID of measurements; (3) ESU (Energy Storage Unit) reports current state of charge and charge/discharge capabilities and current rate of charge/discharge to SMP computer for each phase to which it is connected, time stamped against synchronized time reference; (4) SMP computer compares current load as seen by SIMs (measurement units) against desired level of electricity provider viewed load (as derived locally or instructed from remote via ECU [Communications Unit]) and then issues command to Energy Storage Units instructing each unit with (i) charge or discharge, (ii) power level to charge/discharge, (iii) max duration of charge discharge in case of loss of communication, and (iv) phase of power against which this is to apply for each phase; and (5) External Communications Unit securely transmits data on time synchronization, performance, confirmations of downloaded instructions, updates, etc. to central operations system.

In one embodiment, an intelligent charge system may include a networked measurement unit (SIM), a networked measurement unit (SIM) connected at the output of one or more variable generator, one or more energy storage unit (ESU), one or more site monitoring processor (SMP), and one or more external communication unit (ECU).

The networked measurement unit (aka premise sensor) may be a high speed, high accuracy networked measurement unit (SIM in FIG. 3) which may measure the current, current direction, and voltage on each phase of the power location to which it is attached. One or more networked measurement unit may be provided to give voltage and current measurements. At least one SIM in a installation may be designated as the premise power (i.e. power as seen by a connected external electricity provider). This SIM unit may take measurements and may report the measurements via a communications protocol and appropriate methods (Ethernet, power line communications, serial port, etc. as appropriate for the physical site) to the site monitoring processor (aka SMP computer). Such measuring and reporting may occur at a rapid rate (e.g., <1 second time interval, or at any other time interval described).

When reported, the measurements may be time stamped using a common time reference. In some embodiments, the common time references may be established by the SMP or ECU. However, the common time reference may originate from any other component of the system, such as a SIM or ESU, or may appear external to the system, such as provided by GPS or an NTP (Network Time Protocol). This premise unit may be preferably embodied as per U.S. patent application Ser. No. 12/716,258 filed on Mar. 2, 2010, which is hereby incorporated by reference in its entirety. Preferably, the SIM unit may be installed on the customer side of the electricity provider meter. Thus, the electricity provider may not need to know the SIM unit is installed.

Another SIM unit (aka variable generator sensor) may be connected at the output of one or more variable generator(s) AC output (although this could also be DC). The variable generator SIM may provide high speed, high accuracy measurement of current, current direction, and/or voltage on each phase of the power location to which it is attached. For example, the measurement and/or reporting may occur at a rapid rate (e.g., <1 second time interval, or any other time interval described). The variable generator SIM may be identified as the variable generator(s) and may report the measurements via a communications protocol and appropriate methods (Ethernet, power line communications, serial port, etc. as appropriate for the physical site) to the Site Monitoring Processor (SMP computer). Similarly, the other SIM unit may be time stamped using a common time reference as established, for example, by the SMP or ECU or any other source. In some embodiments, the variable generator may report measurements at a rapid rate, which may include the time intervals or rates discussed elsewhere herein. In some embodiments, a variable generator may have a variable generator clock local to the generator. The variable generator may use the variable generator clock for time synchronization. Alternatively, the variable generator may use other clocks within the system or external to the system for time synchronization of information provided by the SIM unit. In some embodiments, information provided by the SIM unit may include a timestamp. Preferably, the SIM unit may be installed on the customer side. In some embodiments, variable generation may be owned and/or operated by the customer, while in other embodiments, the variable generator may be owned and/or operated by a third party.

The intelligent charge system may also include one or more Energy Storage Units (ESU). An ESU may contain a computer, communications capability compatible with the SMP, and/or electrical energy storage capacity connected to one or more inverter chargers which are then attached to the AC power of the premise. Preferably, the inverter charger may a bidirectional energy converter of the type described in U.S. patent application Ser. No. 12/731,070 filed Mar. 24, 2010, which is hereby incorporated by reference in its entirety.

The ESU is capable of at least the following functions: storing electrical energy, charging and discharging the electrical energy storage, measuring and reporting the level of energy storage contained in it, and/or periodically measuring and reporting the level of current and voltage it is using to charge or discharge. The period of measurement may be settable by a command from the SMP or as a preset in the programming of the ESU's on board computer. The measuring and/or reporting may occur rapidly (e.g., <1 second time interval, or any other time interval mentioned). The ESU may also be capable of being connected to the premise electrical system and in phase with electrical power provided by an external electricity provider. Such connections may ideally be via a standard method such as IEEE 1547 or UL 1741 which is used by Solar & Wind or other such variable generation sources. The ESU may also be able to communicate, preferably securely, with the SMP and potentially with the other units in the system in case of a failure of the SMP or the designation of one or more backup SMP units.

In some embodiments, the ESU may also have the ability to receive, interpret and respond to power release command such as charge, discharge, idle, shutdown, maintenance, etc. with such parameters as necessary to control the timing, duration, phase, voltage and/or current levels of the appropriate action as well. The ESU may also have the ability to respond as to the status and success of such actions with synchronized time stamped reporting so data from all sources in the system may be looked at and analyzed in their actual performance. The ESUs may be able to respond rapidly (e.g., <1 second interval, or at any other time interval mentioned).

In some embodiments a plurality of ESUs may be provided. Each ESU may be individually controllable, or may be controllable as a group or subgroup. In some embodiments, each ESU may have an on-board computer, while in others, only selected ESUs may have on-board computer that may control one or more ESU. In some embodiments, ESUs with a computer may be a master unit, which may control slave units that do not have computers. The ESUs may be connected to one another in series or in parallel, or in any combination thereof. In some instances, backup ESUs may be provided, which may operate in the event of the failure of other ESUs.

An intelligent charge system may also include one or more SMP computers which may maintain algorithms, and active and historical data, to calculate and dispatch and verify the commands to one or more ESUs. The SMP(s) may accept real time data from the one or more SIMs in the installation. For example, the SMPs may accept data from a SIM for premise and one or more SIM for any variable generator(s) on site. In some embodiments, at least one SIM may be provided for each variable generator, while in other embodiments, sometimes variable generators may share SIMs.

The SMP may collect and maintain data on the current state of charge and capability for charge/discharge of the one or more ESUs on site. The SMP may also apply the appropriate power level charge/discharge analysis algorithm and issues instructions to the one or more ESUs as to the action the ESUs should take. Periodic data reporting for billing purposes, performance monitoring, algorithm improvement and alarm reporting may be handled by the SMP and transmitted to a central database and monitoring system via one or more ECU on premise with installation.

One or more external communication units may be used by the system, which may use appropriate communication inside the premise where the invention is installed (e.g., power line communications, Ethernet, wireless, serial port, etc.) to route and securely communicate over the Internet (or LAN, WAN, or other such data network) to and from the central database and monitoring system as well to obtain and maintain a highly accurate time reference clock obtained via either internal clock or via synchronization with one or more time sources using the Internet NTP standard.

FIG. 3 may also demonstrate how the intelligent charge system may operate. The following steps may be optional, or may occur in sequence or in a different order than as provided.

(1) The system may be installed, may power up and may performs self diagnostics and device behavior tests during which each of the components may be synchronized in time to one another. The initial state of the system may be identified and established within the SMP. Various operational parameters and operating limits may be retrieved from a central data store via the ECU, or possibly loaded locally by a technician, or locally attached data storage mechanism. Once checks are complete, steps may be repeated at high frequency as set in the operational parameters for the particular installation.

In preferable embodiments, the high frequency may be such that one or more steps may occur at a rapid rate. For example, the steps may occur every 5 minutes or less, 3 minutes or less, 1 minute or less, 30 seconds or less, 15 seconds or less, 10 seconds or less, 5 seconds or less, 3 seconds or less, 1 second or less, 500 ms or less, 100 ms or less, 50 ms or less, 10 ms or less, or 5 ms or less.

(2) A SIM may be assigned and installed to measure full premise power, and take measurements. The measurement may be of high sample rate data, time stamped against a synchronized time reference, which may then be sent to one or more SMP computers, giving phase, voltage and current measurements and source ID of measurements. If the power were to go out from the external electricity provider, the SIM may maintain a counter and internal battery backup and periodically test for the return of power from the external electricity provider. This may provide a contingency in the event of a blackout. Once operations are restored from the external electricity provider's outage, this outage data and associated parameters may be reported to the local SMP(s) during the reinitialization stage (1) for upstream reporting.

(3) One or more SIMs may be attached to the output of an onsite variable generator (DC or AC) and may send high sample rate data, time stamped against synchronized time reference, to one or more SMP computers, giving phase, voltage and current measurements and source ID of measurements.

(4) An ESU may report the current state of charge and charge/discharge capabilities and current rate of charge/discharge (voltage, current and phase) to one or more SMP computers. The data may be time stamped against a synchronized time reference. In some instances, the synchronized time reference may be obtained from the ECU or an SMP synchronized to an ECU, or any other source.

(5) The SMP computer may compare current load as seen by SIMs (measurement units) against a desired level of electricity provider viewed load. The desired level of load may be derived locally or instructed from remote via ECU. The current generation by the local variable generator(s) may be applied with the local utilization algorithm. Thus, the SMP may receive and/or consider information from a premise SIM, a variable generator SIM, an ESU, and a premise distribution panel. The SMP may then issue commands to one or more ESUs, instructing each unit with at least one of the following: (i) charge or discharge, (ii) power level to charge/discharge, (iii) max duration of charge discharge in case of loss of communication, and (iv) phase(s) of power against which this is to apply for each phase.

(6) The ECU may securely transmit data on time synchronization, performance, confirmations of downloaded instructions, updates, etc. to a central operations and monitoring system.

Figure 4A:
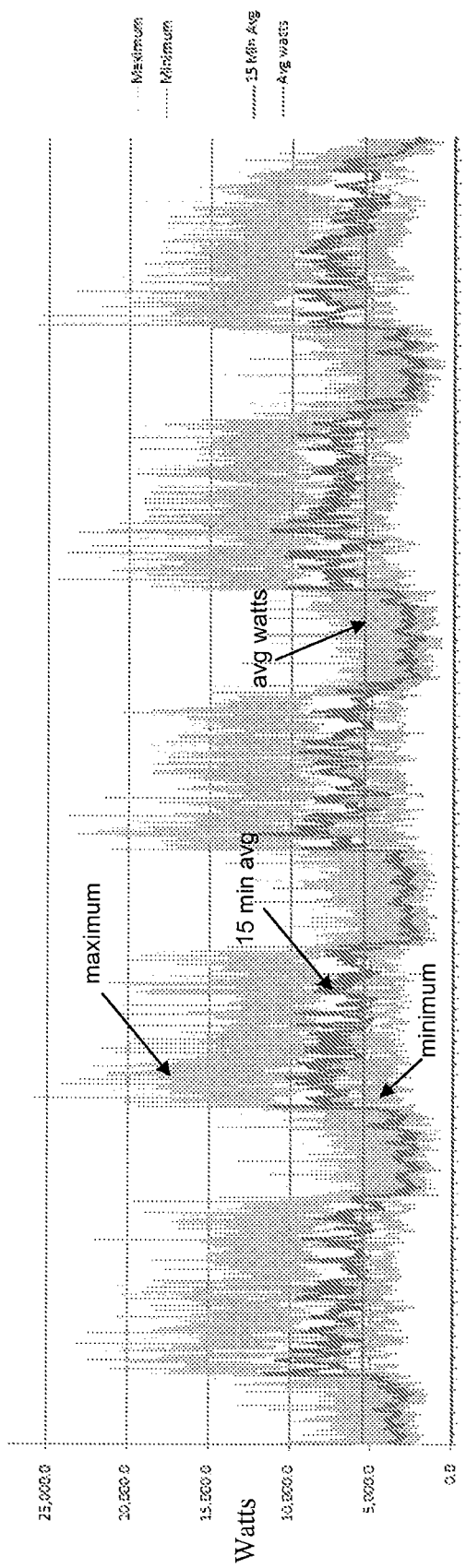
FIG. 4A shows an example of a typical power load over a five day period.

FIG. 4A shows an example of a typical power load over a five day period. The typical power load may include a maximum power load and a minimum power load. Both the maximum power load and the minimum power load may fluctuate wildly over time. When a high sample rate is taken, the variation in the maximum and minimum power loads become apparent. The maximum power demand is shown in pale blue and is the upper fluctuating line of the chart. The minimum power demand is shown in pale pink and is the lower fluctuating line on the chart. There may be a significant difference in the true power peak demand and the minimum demand.

Figure 4B:
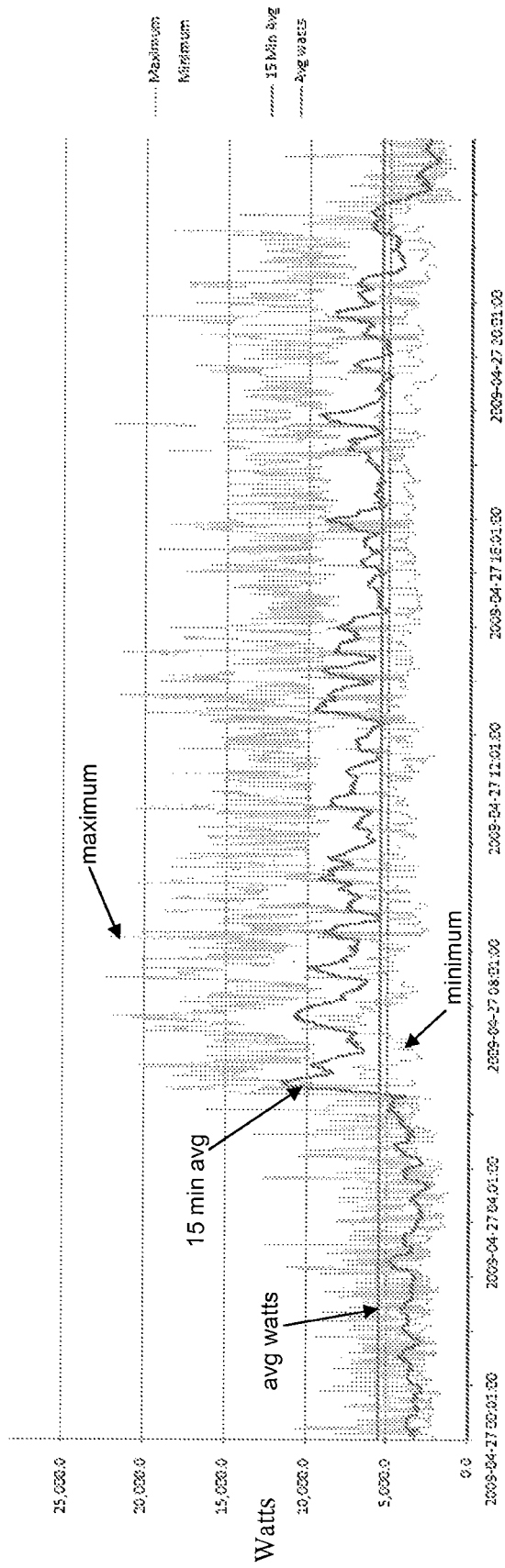
FIG. 4B shows an example of a typical power load at a higher resolution over a one day period.

The chart also includes a 15 minute average current. The 15 minute average current falls between the maximum and minimum power loads. The 15 minute average current may also fluctuate. The 15 minute average is shown in bright blue and is the fluctuating line between the maximum and minimum loads. The chart also includes the average number of watts for the time period. The average watts for that time period is displayed as a constant horizontal orange line. For some of the time, the 15 minute average power demand is over the average watts line, and for some of the time, the 15 minute average power demand is below the average watts line. The average watts line may be the load as seen by the utility based on traditional FIG. 4B shows an example of a typical power load at a higher resolution over a one day period. The typical one day power load may include a maximum power load and a minimum power load. Both the maximum power load and the minimum power load may fluctuate wildly over time. The variation in the maximum and minimum power loads may become apparent at the higher resolution. The maximum power demand is shown in pale blue and is the upper fluctuating line of the chart. The minimum power demand is shown in pale pink and is the lower fluctuating line on the chart. There may be a significant difference in the true power peak demand and the minimum demand.

The chart also includes a 15 minute average current. The 15 minute average current falls between the maximum and minimum power loads. The 15 minute average current may also fluctuate. The 15 minute average is shown in bright blue and is the fluctuating line between the maximum and minimum loads. In some instances, portions of the 15 minute average may be greater than the maximum load or less than the minimum load. In some parts, the 15 minute average may not fluctuate as much as the maximum or minimum loads. The chart also includes the average number of watts for the time period. The average watts for that time period is displayed as a constant horizontal orange line. For some of the time, the minute average power demand is over the average watts line, and for some of the time, the minute average power demand is below the average watts line. The 15 minute average power demand may cross the average watts line multiple times during the day, e.g., during the peak period.

The higher sample rate, as illustrated in FIG. 3B may be contrasted with what is used by traditional utility and battery approaches. Traditional utility and battery approaches may not have as high a sampling rate and do not achieve the level of resolution that shows the variation in power demand.

Figure 5:
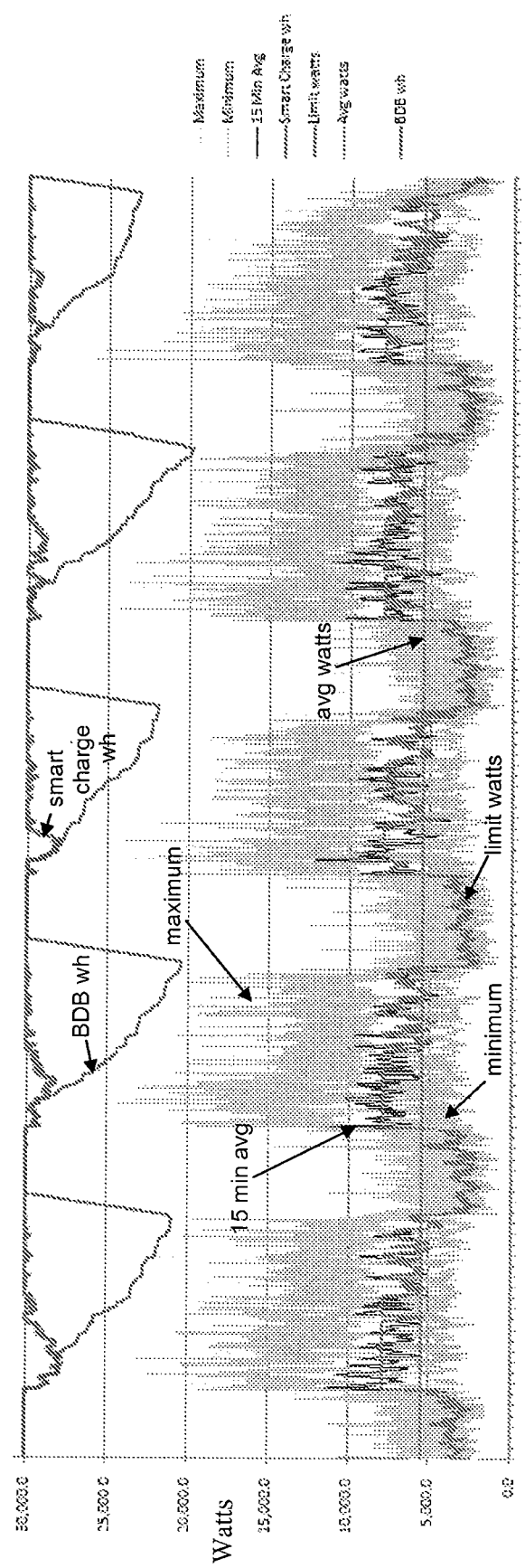
FIG. 5 shows a diagram of a discharge curve for smart charged energy storage along with a comparison of energy storage size needed to achieve same level of peak load adjustment.

FIG. 5 shows a diagram of a discharge curve for smart charged energy storage along with a comparison of energy storage size needed to achieve same level of peak load adjustment. The top portion of the diagram shows the watts hours capacity required by a traditional standard energy storage application method to achieve peak demand reduction to a target level. The capacity required by the traditional energy storage application is shown in red and starts off at a set level at the end of an off-peak time period, and gradually decreases as the peak time period progresses. The top portion of the diagram also shows the watts hours capacity required by a high speed "smart" energy storage application method. The capacity required by the smart energy storage application is shown in green and also starts off at a set level at the end of an off-peak time period, and fluctuates as the peak time period progresses. However, since in the smart system, the energy storage may be recharged, even during the peak period, the energy storage state of charge does not decrease as much as the energy storage in a traditional application. The energy storage may be both charged and discharged during peak hours. Thus, in a smart system, a smaller energy storage may be required than in a traditional energy storage system.

The diagram also shows maximum and minimum loads, as well as a 15 minute average load. The diagram also includes the limit watts shown in bright blue. The limit watts may be an apparent demand as seen by a utility, and in some embodiments does not exceed a certain threshold value. For example, as shown in the diagram, the limit watts may roughly follow the 15 minute average load but be prevented by properly timed discharge from exceeding a particular threshold.

FIG. 6 shows an example of a variable generation curve of a typical variable generator installation. In some embodiments, the variable generation curve may fluctuate over time. For example, there may be some times, such as the evening, when the variable generator may not produce as much energy. For example, photovoltaic cells will not produce much energy when it is dark out. Furthermore, the amount of energy produced may fluctuate depending on cloud cover, angle of the sun, or other environmental conditions. Similarly, for wind-based generation systems, depending on the amount of wind available, the power output may vary.

FIG. 7A shows an example of power adjustment achieved without storage synchronization. The variable generation is shown at the bottom of the diagram as solar watts (in light blue). The variable generation may reduce the demand level to the utility (e.g., for billing) at some parts of the day. The diagram shows that the demand level to the utility (shown in bright blue) falls beneath the actual 15 minute average (shown in black). However, in this situation, there is no peak level demand billing reduction achieved with the variable generator alone. In this situation, the peak level occurs early in the day, before the variable generator really produces any power. Thus, there may often be situations in systems with variable generators without storage synchronization where the peak demands may occur when the variable generator is not producing power or is not producing much power. Thus, variable generators alone are often insufficient to offset peak level demand billing.

Figure 7B:
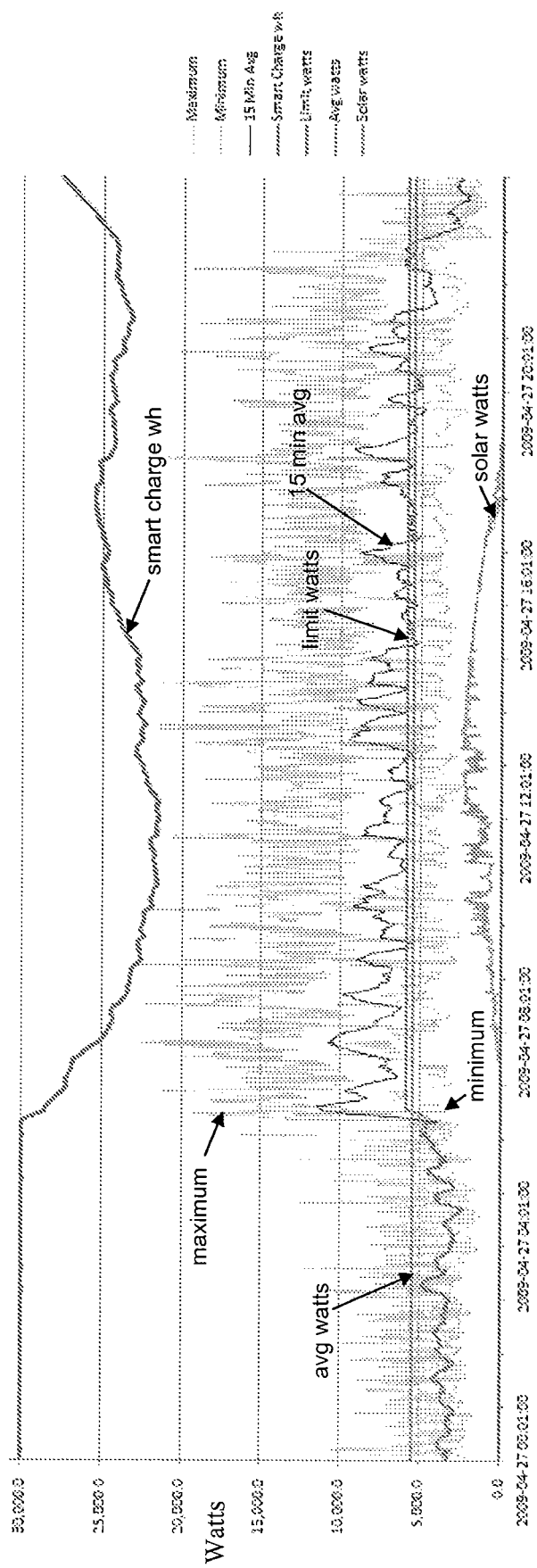
FIG. 7B shows an example of power adjustment achieved with storage applied.

FIG. 7B shows an example of power adjustment achieved with storage applied. The use of the variable generator (shown at the bottom of diagram in light purple) and an energy storage system (shown at the top in green) may achieve significant demand reduction. The demand level to the utility (shown in bright blue) may be achieved by making up any difference between the desired demand level and the variable generator power by using the energy storage system. In some instances, the demand level to the utility may not exceed the desired demand level, which in some instances may be a constant value. Alternatively, the desired demand level may change with time.

Figure 8A:
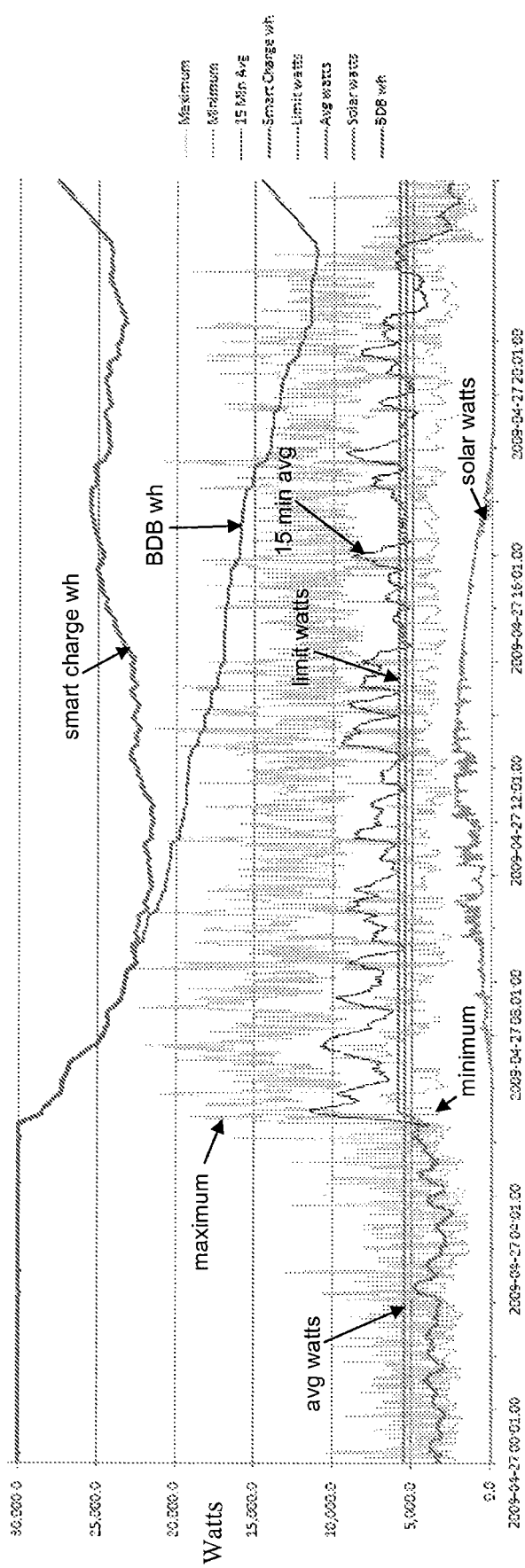
FIG. 8A shows an example of a discharge curve for a smart charged battery and comparison of battery size needed to achieve the same level of load adjustment.

FIG. 8A shows an example of a discharge curve for a smart charged battery and comparison of battery size needed to achieve the same level of load adjustment. For a given level of peak demand reduction in power (bright blue line), an intelligent charge system (green line) may use less energy storage capacity than traditional approaches (red line) when used with variable generation. This may be due to the high frequency adjustment provided by the intelligent charge system. Additionally, the intelligent charge system may enable an energy storage system to be charged, even during peak hours. Since the intelligent charge system may require less energy storage than traditional approaches, it may provide the benefit of allowing for smaller energy storage units to be used in the system.

Figure 8B:
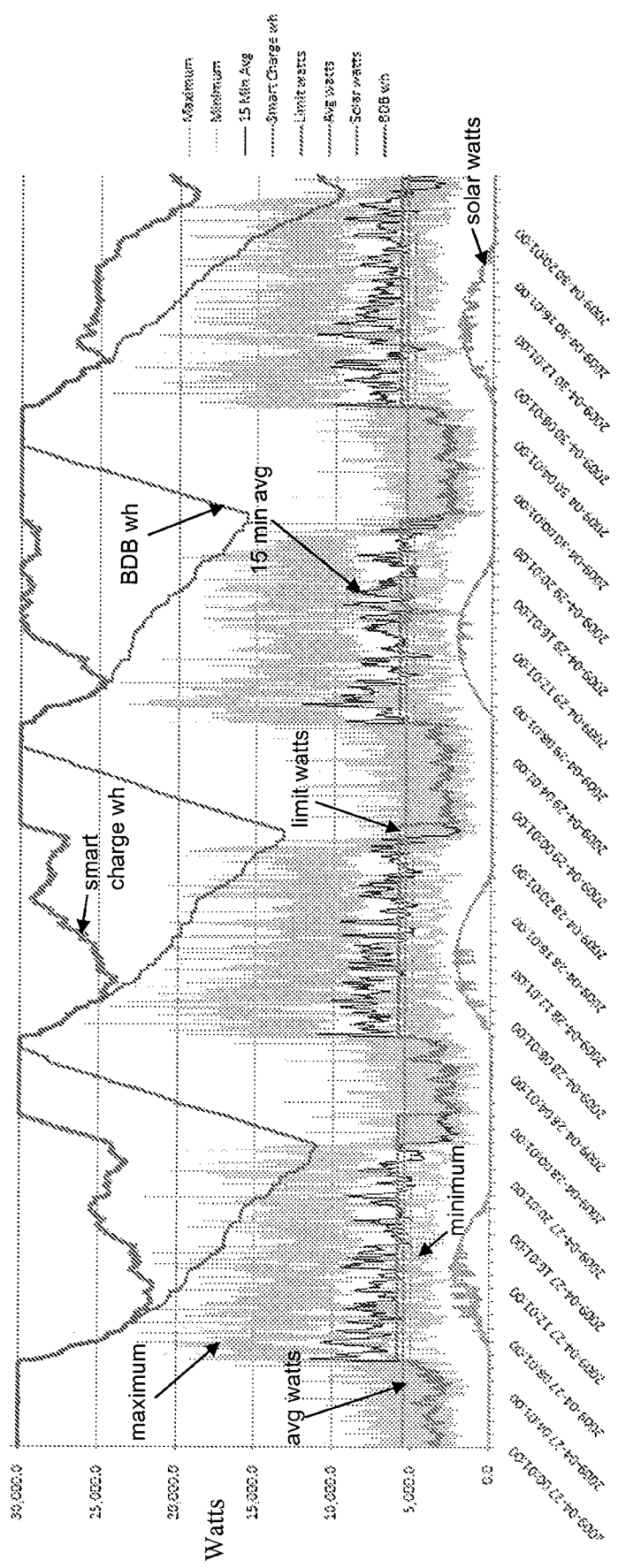
FIG. 8B shows a discharge curve for a smart charged battery and comparison of battery size for a four day period.

FIG. 8B shows a discharge curve for a smart charged battery and comparison of battery size for a four day period. For given level of peak demand reduction in power (bright blue line), an intelligent charge system (green line) may use less energy storage capacity than traditional approaches (red line), when used with variable generation. Longer term (4 day) example shows a consistently better performance by an intelligent charging technique than a standard approach with variable generation.

Figure 9:
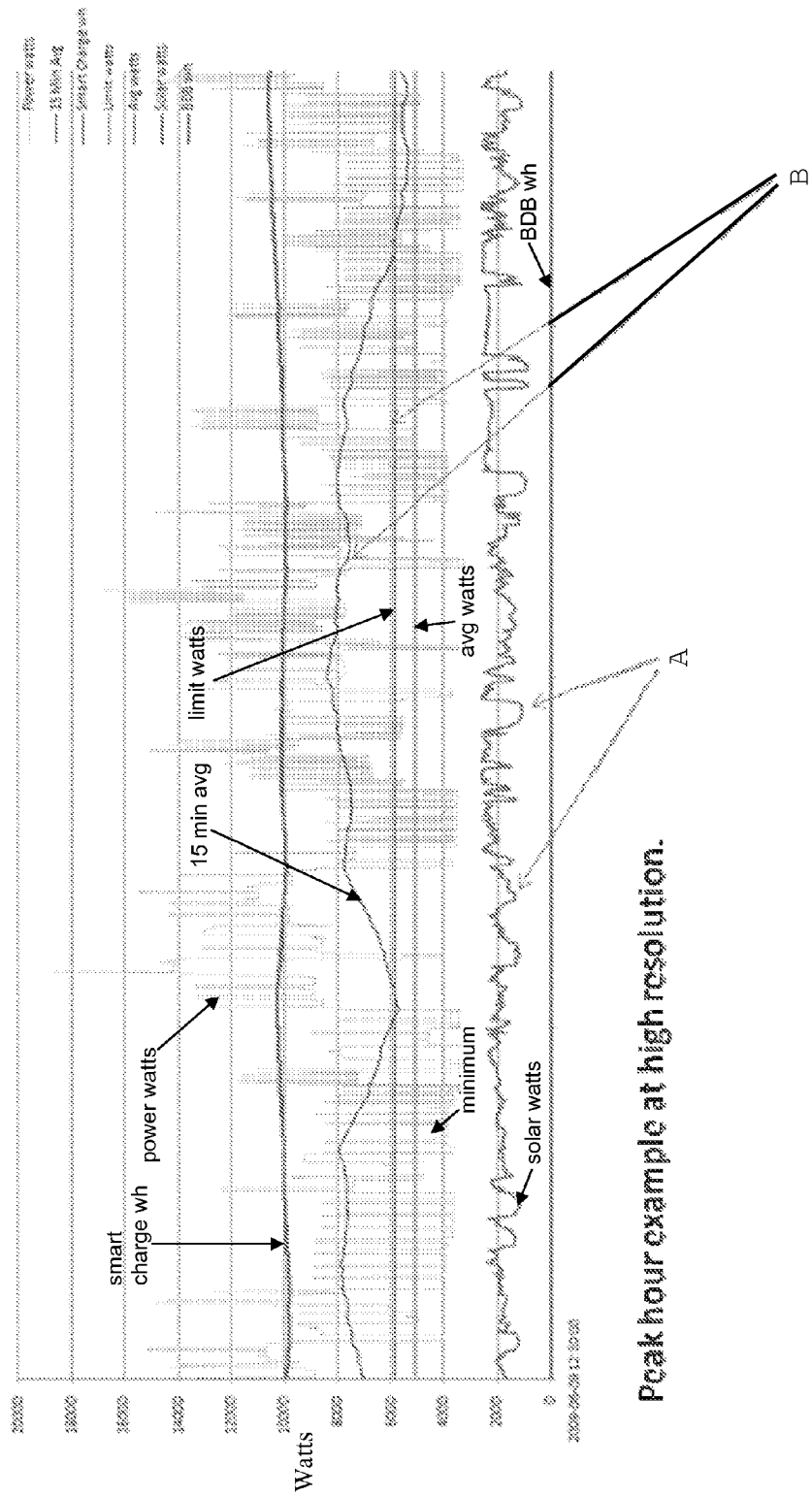
FIG. 9 shows high resolution data of variable generation versus demand.

FIG. 9 shows high resolution data of variable generation versus demand. The diagram is a summary case showing an example of variable power load in the real world case (light red), a rolling 15 minute average as normally seen by an external electricity provider (black line), a variable generator (in this case a 2 KW solar generator—real world data, shown at the bottom of the diagram), a 15 KWH energy storage unit's state of charge during period when utilizing an intelligent charge system described (green line) and the external electricity provider's expected view after the intelligent charge system is applied (bright blue line). This data may be reflective of a peak hour.

As shown, the external electricity provider's expected view may be a substantially level line in some embodiments. The energy storage unit's state of charge may be controlled by charging and discharging the energy storage unit in order to compensate for the difference in a desired external electricity provider's expected view, the load, and the power provided by a variable generator. This may be made apparent by the difference between a non-storage affected grid average (black line) as compared to the flat average line when energy storage is applied (bright blue line). In some instances, a variable generator variability and production may drop coincident with a demand load increase. At such times, it may be desirable to discharge an energy storage unit. In regard to reference numeral "A" in FIG. 9, note solar generation variability & production drops coincident with demand increase. In regard to reference numeral "B" in FIG. 9, note variance in non-storage affected grid average compared to flat line average when storage is applied.

Figure 10:
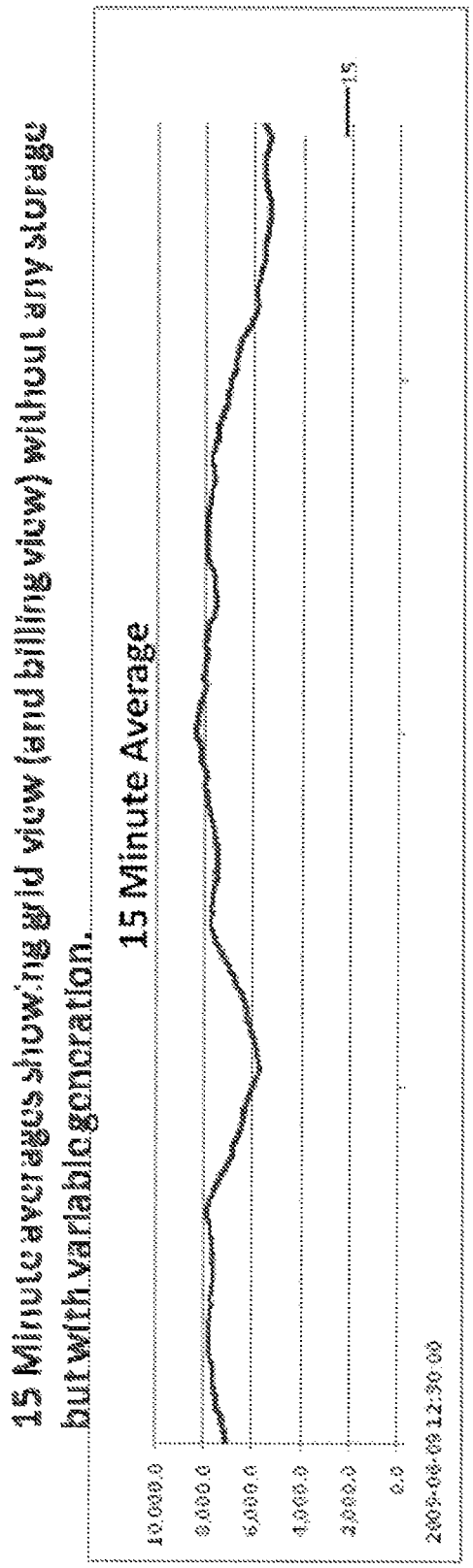
FIG. 10 is a 15 minutes average showing a grid view without any storage but with variable generation.

FIG. 10 is a 15 minutes average showing a grid view without any storage but with variable generation. Individual line graph shows an example of a rolling 15 minute average of load as seen by external electricity provider without using an intelligent energy storage system applied, but showing impact after variable generation may be applied to a typical commercial or residential grid connected installation.

Figure 11:
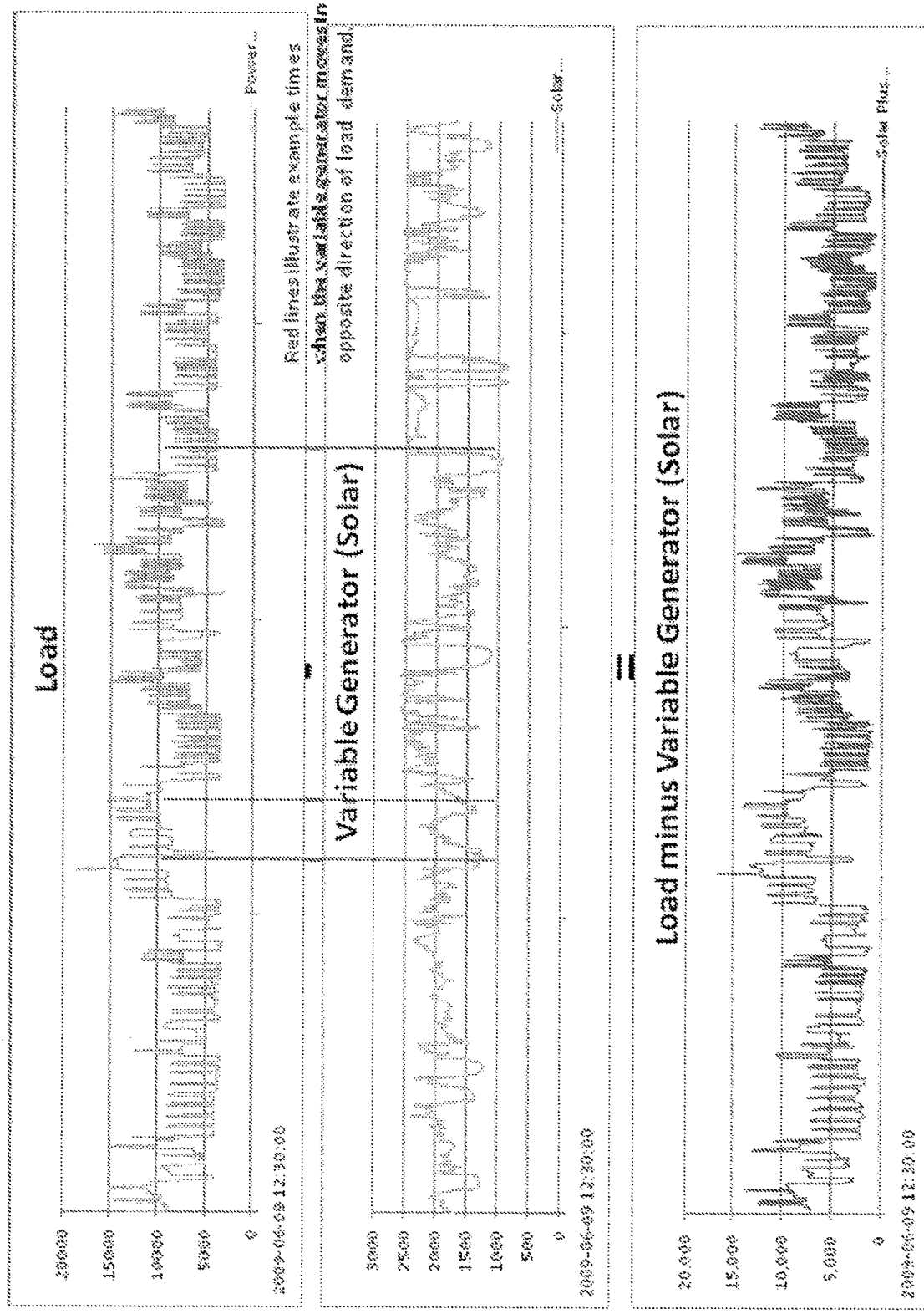
FIG. 11 shows an example of a load and variable generator, to show the load minus the variable generator.

FIG. 11 shows an example of a load and variable generator, to show the load minus the variable generator. The diagram may show power curves showing isolated load measurement. The isolated load measurement may fluctuate with time. The diagram may also show an aligned variable generator output, which may also fluctuate with time. The diagram also shows a combined load minus variable generator. The combined result may still show a high degree of variability with no significant reduction in peak load. Red vertical line illustrates example moments where the load and generator behaviors are opposite (load up-generator down or load down-generator up). The combined result may provide an example of a load as seen by a utility provider in a traditional system that does not utilize an energy storage system.

Figure 12:
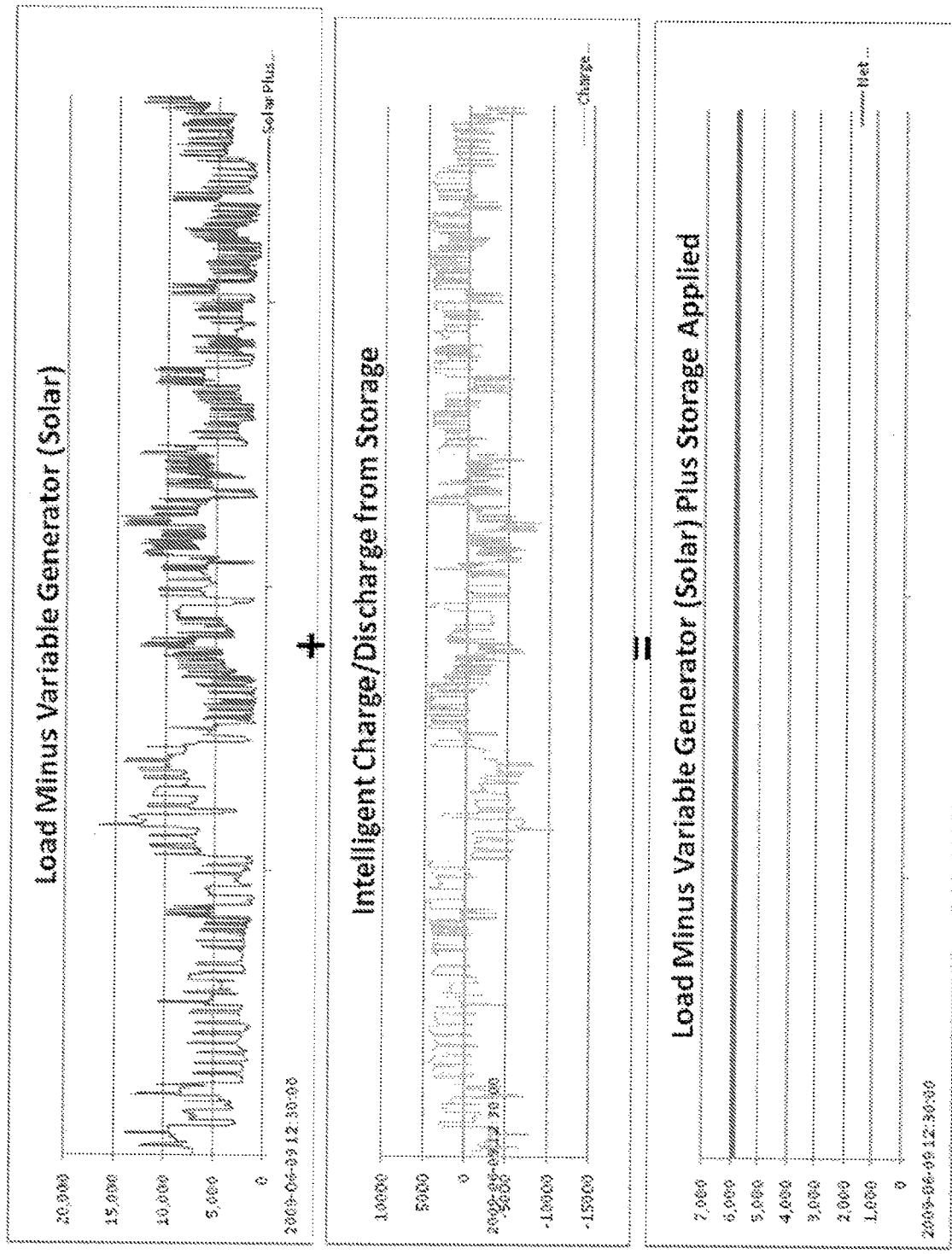
FIG. 12 shows a load minus variable generator and an intelligent charge/discharge from storage, to show the load minus variable generator plus storage.

FIG. 12 shows a load minus variable generator and an intelligent charge/discharge from storage, to show the load minus variable generator plus storage. The power curves may show impact of an energy storage system on power load as seen by external electricity provider. The first power curve shows the load minus the variable generator, which may still fluctuate. The second power curve may show intelligent charge/discharge from storage. When a desired load is constant, the intelligent charge/discharge curve may be a mirror image of the load minus variable generator curve, in that the intelligent charge/discharge curve may increase as much as the other curve decreases and vice versa. When the intelligent charge system with energy storage is applied, the "intelligent charge/discharge" plot may show the output of the invention's computation and resulting level and duration of power outputs that, when applied to the load, may result in the final plot showing flat power load demand at the level set by the intelligent charge system as would be seen by the external electricity provider. In some embodiments, the intelligent charge/discharge may be slightly time delayed due to measurement, communications and computation time delays.

By closely analyzing the actual pattern of power demand and power generation timing, it may become apparent that the coincidence of generation and demand peaks may be nearly random and that the performance of each is very often in opposite directions of desired behavior if seeking a more efficient performance (See, e.g., FIG. 11). By storing up power in advance of the use period, and then supplementing that power with the power generation from the variable generator, the stored energy could be applied rapidly to charge and discharge to a targeted limit of net power draw from the local electricity utility then the load as seen by the external electricity can be leveled to that desired target.

This leveling and synchronizing may be achieved by the invention though the following procedure and components as shown in FIG. 3.

FIG. 13 shows a comparison of 15 minutes average for a grid view without storage but with variable generation, and 15 minutes average for a grid view with storage and with variable generation. As previously mentioned, this may accentuate the contrast between a grid view for a system without storage, where there is significant variation, and a grid view for a system with intelligent storage, where there is minimal variation. The system without the storage shows 15 minute peaks of over 8,000 (eight thousand) watts and the system with the intelligent storage system may be flat at just under 6,000 (six thousand watts). Thus, a lower peak may be provided, which may result in a more cost-effective system. Furthermore, no changes to the customer's equipment, behavior or the functionality or specifications of the variable generator may be necessary to achieve better performance and greater efficiency.

Various benefits may be realized by utilizing an intelligent charge system as described. For example, an apparent 15 minute rolling demand as seen by an external electricity provider may be leveled to a desired target. Also, the energy from a variable generator on site may be used and synchronized more effectively, matching the peaks in the generators output with the peaks of the premise's load. This may allow for effective power demand reduction from a renewable generator. Such improvement in demand reduction may result in greater value delivery from the energy produced by the variable generator.

Another benefit of the intelligent charge system may be that the size of battery needed to perform the leveling (see prior patent discussion) may dramatically reduced. For example, for traditional technologies:

$$EnergyStorageCapacity(x) = \\ (MinimumChargeLevel\% * MaxloadinKWH) + \\ \frac{\sum_{n=1}^{Intervals\ in\ duration}[(Power_{over})IntervalLength]}{(DischargeEfficiency)}$$

By contrast, the intelligent charge system may allow a battery size as follows:

$$EnergyStorageCapacityNEW(x) = \\ (MinimumChargeLevel\% * MaxloadinKWH) + \\ \sum_{n=1}^{Intervals\ in\ duration}\left[\frac{\left(\frac{Power_{over}}{(DischargeEfficiency)} - \left(Power_{under} * ChargeEfficiency\right)\right) - (Power_{generator})}{IntervalLength}\right]$$

The formulas demonstrate that the energy storage size required using an intelligent charging technique may be smaller than the size required under current commonly used techniques. For example, using the intelligent charging technique may reduce the energy storage capacity needed by 60% or more, 50% or more, 40% or more, 30% or more, 20% or more, 10% or more, or 5% or more compared to traditional energy storage systems. Further, the data shows that the higher the rate of measurement (i.e. the shorter the time frame) that the more power under the limit targeted there will be, and so further reducing the energy storage capacity needed.

Thus, the intelligent charge system and technique may allow for energy storage depth of discharge to be reduced, resulting in a longer working life of the energy storage component. For example, using the intelligent charging technique may increase the working life of the energy storage component by 60% or more, 50% or more, 40% or more, 30% or more, 20% or more, 10% or more, or 5% or more compared to traditional energy storage systems. With a longer life and reduced size, the effective cost of energy storage for a given level of return from demand charge reduction may be reduced, thereby making the solution more cost effective. By achieving a level load, the efficiency of any generation used by the external electricity provider may be improved. (See, e.g., Sandia National Laboratory Study of Meklatkatla Island 1996-1997). Also, by supplementing the short term voltage and current, they may be kept in phase with each other and result in an improved power factor for the premise.

Any of the systems, methods, or devices described may utilize any components, features, or steps known in the art, including but not limited to U.S. Pat. Nos. 5,369,353; 6,522,031; 4,752,697; U.S. Patent Publication No. 2003/0007369; U.S. Pat. No. 5,274,571; U.S. Patent Publication No. 2002/0190525; U.S. Patent Publication No. 2007/0200433; U.S. Pat. No. 4,287,465; U.S. Patent Publication No. 2007/0145952; U.S. Patent Publication No. 2009/0146423, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A smart charge system comprising:
    a premise sensor that:
        monitors an amount of power flowing through a power feed that is in electrical communication with an electricity provider, and
        generates time-synchronized premise power information that is time synchronized with a first time-synchronization reference;
    an energy storage unit comprising:
        one or more batteries, and
        a bidirectional power converter that controls a first amount of power transferred in either direction between the power feed and the one or more batteries,
        wherein the energy storage unit provides a first time-synchronized state-of-charge of the one or more batteries that is time synchronized with the first time-synchronization reference; and
    a control computer configured to:
        receive, from the premise sensor, the time-synchronized premise power information,
        receive, from the energy storage unit, the first time-synchronized state-of-charge, and
        provide, to the energy storage unit and based on each of the time-synchronized premise power information and the first time-synchronized state-of-charge, a charge/discharge instruction,
    wherein the energy storage unit, in response to the charge/discharge instruction, charges/discharges the one or more batteries to mitigate variations in power transported via the power feed.

2. The smart charge system of claim 1, further comprising a variable generator sensor that:
    monitors an amount of power flowing from a variable generator, and
    transmits time-synchronized variable generator power information to the control computer, wherein the time-synchronized variable generator power information is time synchronized with the first time-synchronization reference.

3. The smart charge system of claim 2, wherein at least one of the premise sensor or the variable generator sensor is provided on a customer side of the smart charge system.

4. The smart charge system of claim 2, wherein the variable generator is at least one of a wind generator, a solar electric generator, a water-powered generator, or a geothermal generator.

5. The smart charge system of claim 1, wherein the control computer provides the charge/discharge instruction every 1 second or less.

6. The smart charge system of claim 1, wherein the control computer provides the charge/discharge instruction every 15 minutes or less.

7. The smart charge system of claim 1, wherein:
    the energy storage unit comprises two or more energy storage units, each of the two or more energy storage units comprising:
        one or more batteries, and
        a bidirectional power converter coupled to the one or more batteries, and
    each of the two or more energy storage units provides a distinct time-synchronized state-of-charge of the one or more batteries.

8. The smart charge system of claim 7, wherein the control computer provides the distinct charge/discharge instructions to the two or more energy storage units.

9. The smart charge system of claim 1, wherein the charge/discharge instruction includes at least one of:
    instructions to charge or to discharge the energy storage unit,
    a target power level at which to charge or discharge the energy storage unit,
    a maximum duration to charge or to discharge the energy storage unit in case of loss of communication, or
    a phase of power against which the charge/discharge instruction is to apply for each phase.

10. The smart charge system of claim 1, wherein the energy storage unit is provided on a customer side of the smart charge system and is capable of being installed with pre-existing equipment on the customer side of the smart charge system.

11. The smart charge system of claim 1, wherein the control computer further comprises a communication device that receives instructions from a central operation system.

12. A method of power monitoring and management comprising:
    receiving, at a controller, time-synchronized premises power information from a premises sensor, wherein the premise sensor senses an amount of power flowing through a power feed that is in electrical communication with an electricity provider and the time-synchronized premises power information is time synchronized with a first time-synchronization reference;
    receiving, at the controller from an energy storage unit, a first time-synchronized state-of-charge of one or more batteries included in the energy storage unit, wherein the first time-synchronized state-of-charge of the one or more batteries is time synchronized with the first time-synchronization reference;
    generating, by the controller and based on each of the time-synchronized premise power information and the first time-synchronized state-of-charge, a charge/discharge instruction; and transmitting, from the controller to the energy storage unit, the charge/discharge instruction, wherein a bidirectional power converter included in the energy storage unit, in response to the charge/discharge instruction, charges/discharges the one or more batteries to mitigate variations in power transported via the power feed.

13. The method of claim 12, further comprising:

receiving, at the controller from a variable generator sensor, time-synchronized variable generator power information that is time synchronized with the first time-synchronized reference, wherein the variable generator sensor monitors an amount of power flowing from a variable generator, and wherein the charge/discharge instructions are further based on the time-synchronized variable generator power information.

14. The method of claim 13, wherein the variable generator comprises at least one of a wind generator, a solar electric generator, a water-powered generator, or a geothermal generator.

15. The method of claim 12, wherein the charge/discharge instructions are provided every 15 minutes or less.

16. The method of claim 12, wherein the charge/discharge instruction causes the energy storage unit to be charged or discharged.

17. The method of claim 16, wherein:

the energy storage unit maintains a current level while allowing voltage to be varied or maintained, or the energy storage unit maintains a voltage level while allowing the current to be varied or maintained.

18. The method of claim 12, further comprising receiving, at the controller from a central operation system, charge/discharge delivery modifying instructions.

* * * * *

UNITED STATES PATENT AND TRADEMARK OFFICE
CERTIFICATE OF CORRECTION

PATENT NO. : 11,081,897 B2  
APPLICATION NO. : 13/730740  
DATED : August 3, 2021  
INVENTOR(S) : Stacey Reineccius Page 1 of 1

It is certified that error appears in the above-identified patent and that said Letters Patent is hereby corrected as shown below:

In the Claims

Column 24, Claim 17, Line 14, please insert --level-- after current.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*